(12) United States Patent
Emberty et al.

(10) Patent No.: US 6,957,351 B2
(45) Date of Patent: Oct. 18, 2005

(54) AUTOMATED DISK DRIVE LIBRARY WITH REMOVABLE MEDIA POWERED VIA CONTACTLESS COUPLING

(75) Inventors: Robert George Emberty, Tucson, AZ (US); Craig Anthony Klein, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 09/898,403

(22) Filed: Jul. 3, 2001

(65) Prior Publication Data

US 2003/0009700 A1 Jan. 9, 2003

(51) Int. Cl.[7] .................................................. G06F 1/26
(52) U.S. Cl. ....................... 713/300; 700/214; 700/218; 361/685; 323/347
(58) Field of Search ................................ 323/264, 347; 361/685, 725; 700/214, 218; 713/300

(56) References Cited

U.S. PATENT DOCUMENTS

| | | |
|---|---|---|
| 4,787,074 A | 11/1988 | Deck et al. |
| 4,890,894 A | 1/1990 | Kwa |
| 4,914,656 A | 4/1990 | Dunphy, Jr. et al. |
| 4,924,171 A | 5/1990 | Baba et al. |
| 4,989,206 A | 1/1991 | Dunphy, Jr. et al. |
| 5,060,211 A | 10/1991 | Blanding |
| 5,155,785 A | 10/1992 | Holland et al. |
| 5,157,319 A | 10/1992 | Klontz et al. |
| 5,204,866 A | 4/1993 | Block et al. |
| 5,229,652 A | 7/1993 | Hough |
| 5,319,509 A | 6/1994 | Michelson et al. |
| 5,325,046 A | 6/1994 | Young et al. |
| 5,341,280 A | 8/1994 | Divan et al. |
| 5,386,487 A | 1/1995 | Briggs et al. |
| 5,386,567 A | 1/1995 | Lien et al. |
| 5,390,187 A | 2/1995 | Stallmo |
| 5,455,467 A | 10/1995 | Young et al. |
| 5,471,304 A | 11/1995 | Wang |
| 5,475,216 A | 12/1995 | Danver et al. |
| 5,479,653 A | 12/1995 | Jones |
| 5,483,419 A | 1/1996 | Kaczeus, Sr. et al. |
| 5,502,811 A | 3/1996 | Ripberger |
| 5,533,188 A | 7/1996 | Palumbo |

(Continued)

OTHER PUBLICATIONS

"Optical Data Storage Library For Disks Without Cartridges Shell," IBM Technical Disclosure Bulletin, vol., No. 028, Feb. 1994.
U.S. Appl. No. 09/314,173, filed May 18, 1999, Ain et al.
U.S. Appl. No. 09/305,398, filed May 5, 1999, Emberty et al.
U.S. Appl. No. 09/477,546, filed Jan. 4, 2000, Emberty et al.
U.S. Appl. No. 09/477,547, filed Jan. 4, 2000, Buller et al.
U.S. Appl. No. 09/477,548, filed Jan. 4, 2000, Emberty et al.
U.S. Appl. No. 09/898,863, filed Jul. 3, 2001, Emberty et al.
U.S. Appl. No. 09/898,886, filed Jul. 3, 2001, Emberty et al.

*Primary Examiner*—Thomas Lee
*Assistant Examiner*—Albert Wang
(74) *Attorney, Agent, or Firm*—Jean M. Barkley; Dillon & Yudell LLP

(57) ABSTRACT

An automated disk drive library has a rack with drawers that are interconnected with a host computer. A drive carrier having a disk drive is mounted in each drawer. The drive carrier has a front bezel that senses whether the disk drive is latched within the drawer and communicates with the computer. The front bezel also has an optical sensor that may be coupled to an optical probe as an auxiliary data interface with computer. The main data interface for the disk drive is provided by a self-healing optical coupler at the back of the carrier and drawer. Power to the disk drive is supplied via a magnetic coupling with split core transformers on the drive carrier and drawer. The disk drive and carrier may be manually or automatically installed into and removed from drawer via a drive mechanism in the drawer.

21 Claims, 12 Drawing Sheets

U.S. PATENT DOCUMENTS

| | | | |
|---|---|---|---|
| 5,572,685 A | 11/1996 | Fisher et al. | |
| 5,606,161 A | 2/1997 | Schulz | |
| 5,644,705 A | 7/1997 | Stanley | |
| 5,682,276 A * | 10/1997 | Hinnen et al. | 360/92 |
| 5,687,039 A | 11/1997 | Coffin et al. | |
| 5,708,668 A | 1/1998 | Styczinski | |
| 5,712,463 A | 1/1998 | Singh et al. | |
| 5,712,942 A | 1/1998 | Jennings et al. | |
| 5,758,101 A | 5/1998 | Pemberton | |
| 5,781,744 A | 7/1998 | Johnson et al. | |
| 5,784,576 A | 7/1998 | Guthrie et al. | |
| 5,793,909 A | 8/1998 | Leone et al. | |
| 5,793,919 A | 8/1998 | Payne et al. | |
| 5,794,238 A | 8/1998 | Gural | |
| 5,812,761 A | 9/1998 | Seki et al. | |
| 5,896,387 A | 4/1999 | Fujita et al. | |
| 5,901,262 A | 5/1999 | Kobayashi et al. | |
| 5,909,333 A | 6/1999 | Best et al. | |
| 5,925,119 A | 7/1999 | Maroney | |
| 5,930,428 A | 7/1999 | Irwin et al. | |
| 6,031,798 A | 2/2000 | James et al. | |
| 6,034,928 A | 3/2000 | Inoue | |
| 6,177,790 B1 | 1/2001 | Emberty et al. | |
| 6,195,007 B1 * | 2/2001 | Takayama et al. | 340/572.1 |
| 6,290,400 B1 | 9/2001 | Emberty et al. | |

* cited by examiner

AUTOMATED DISK DRIVE LIBRARY WITH REMOVABLE MEDIA POWERED VIA CONTACTLESS COUPLING

The following patent application are currently before the U.S. Pat. and Trademark Office and are incorporated herein by reference: U.S. patent application Ser. No. 09/305,398, filed May 5, 1999, entitled, Self-Healing Coupler for a Serial RAID Device now U.S. Pat. No. 6,446,540; U.S. patent application Ser. No. 09/314,173, filed May 18, 1999, entitled, Auto Enable/Disable System and Method for Computer Interfaced Devices now U.S. Pat. No. 6,442,638; U.S. patent application Ser. No. 09/477,547, filed Jan. 4, 2000, entitled, System and Method for Optically Coupling Component Service Interfaces now U.S. Pat. No. 6,419,403; U.S. patent application Ser. No. 09/477,548, filed Jan. 4, 2000, entitled, Self-Healing Optical Backplane for Coupling Components now U.S. Pat. No. 6,290,240; U.S. patent application Ser. No. 09/477,546, filed Jan. 4, 2000, entitled, System and Method for Distributing Power Between Components Via a Magnetic Coupling now U.S. Pat. No. 6,177,790; U.S. patent application Ser. No. 09/898,863, filed, Jul. 3, 2001, entitled, Apparatus and Method for Automated Interconnection and Disconnection of Disk drive Carrier in a System; and U.S. patent application Ser. No. 09/898,886, filed Jul. 3, 2001 Automated Handling and Interface Mechanism for Library of Disk Drive Carriers.

BACKGROUND OF THE INVENTION

1. Technical Field

The present invention relates in general to an improved disk drive library, and in particular to an improved automated disk drive library.

2. Description of the Related Art

Some present computer systems have the ability to recognize devices that are added to a bus while the computer is operating, that is, without having to reboot the system. "Plug and play" operations allow a computer to configure itself automatically to work with peripherals. The "plug and play" operation allows a computer system to recognize a new device that has been added, but the system typically has to be reset in order to properly initialize the added device with the operating system. "Hot plug" systems and methods were developed as an improvement in this area. In "hot plug" systems and methods, separate reset lines and other features are provided for each peripheral device, such that a device is able to be initialized with the operating system without requiring the entire system to be rebooted (i.e. "hot-pluggable" system).

"Hot-pluggable" devices may be interfaced under various protocols, such as small computer system interface (SCSI), copper fiber or serial storage architecture (SSA), and fiber channel arbitrated loop (FCAL). FIG. 1 shows a SSA example wherein an overall RAID (redundant array of independent disk drives) system 1 with target disk drives 3, that is target drives T0, T1, and T2, are serially linked together to a SSA initiator 6. The SSA RAID system 1 is coupled to and communicates with a central processing unit (CPU) 2 and a host computer 4. The "hot-pluggable" target disk drives 3 are removable from the overall RAID system 1 and thus unlinked from the host computer 4. Typically, a cam mechanism or carrier lever latches the target disk drive 3 to a disk drive drawer. One of the target disk drives 3 is removed from the drawer by unlatching the cam, and the serial link or interface is broken when the target disk drive 3 is physically removed from the drawer.

The problem with the breaking of this link is that the host computer 4 has no way of distinguishing that the target disk drive 3 has been removed over actual problems with the target disk drive 3 or software. Therefore, the host computer 4 assumes that a problem with the target disk drive 3 exists even though the target disk drive 3 has been removed, and various extensive routines and troubleshooting and search algorithms are executed to identify and find the problem despite the fact that the target disk drive 3 has been removed. The computer system 4 attempts to talk to the target disk drive 3 to find a problem, such as data error, power loss, or disk drive removal. In other words, when a target disk drive 3 is removed, the computer system 4 cannot distinguish that the back plane connection for that target disk drive 3 and the link 7 from the backplane connector to SSA initiator 6 have been broken. The host computer 4 assumes that a problem exists and consumes valuable time, power, and computer resources in attempting to identify the problem and to finally find out that the target disk drive 3 has simply been removed. Therefore, the disadvantage and problem with a removable computer interfaced device is that no system or method exists for communicating to the host computer system the fact that such a device has been removed therefrom.

It would therefore be advantageous and desirable to have a system and method of communicating to the SSA initiator and the host computer when a computer interfaced device has been removed from an overall system. It would be advantageous and desirable to provide an automatic enable and disable system and method when a computer interfaced device has been removed from an overall system. It would also be advantageous and desirable to provide a communications system and method to a host computer and to a SSA initiator when an interfaced device has been unlatched and about to be removed from a system, such as when a "hot-pluggable" disk drive has been unlatched and about to be removed from a serial RAID system.

Referring again to FIG. 1, problems also arise when a break in communication or link occurs at any of the target drives 3, such as break 5 at target T0. The serial communication or link has therefore been broken between target T0 and the other serially linked devices, targets T1, T2. As a result, SSA initiator 6 and host computer 4 may no longer be able to access the other serially linked targets T1, T2, such as to access the data stored therein. Therefore, targets T1, T2 typically cannot be accessed until the communication or link problem has been identified and fixed or another access route of the other serially linked target drives are configured. Also, when a break in communication or link occurs, the serial storage architecture is not maintained, and thus the host computer may not be able to recognize the SSA RAID system 1.

It would therefore be advantageous and desirable to have a device for maintaining the serial link between devices when a break in communication or link at one of the devices has occurred. It would also be advantageous and desirable to provide switching of a serial device with a communication or link problem from an inline mode in which the serial device is serially linked to other devices to a by-pass mode in which the serial device is by-passed and the other devices are re-coupled and serially linked together. It would be advantageous and desirable to provide a selfhealing coupler for a serial storage architecture wherein the self-healing coupler bypasses any disk drive or drives in which communication or link has been broken and re-couples and serially links all remaining active disk drives.

In RAID storage subsystems, each drive is loaded in a drive carrier and then mounted in a drawer in the subsystem.

The drives are typically provided with a service interface on one end that is accessible only when the drive is not mounted in the carrier. As depicted in FIG. 2, the drive 12 has a maintenance and/or service interface 13 that is usually provided via a conventional RS232 connector. A universal asynchronous receiver/transmitter 9 (UART) provides RS232 capability for downloading debug information, new microcode, etc.

However, when the drives are installed in the RAID drawer, the service interface 13 is not externally accessible due to the presence of the drive carrier 15 (FIG. 3). Carrier 15 has a front bezel 17 that is provided for aesthetic purposes. If a drive were to require external diagnosis or service, the drive must be removed from the drawer. Unfortunately, any volatile failure information contained in the drive at the service interruption would be lost when the drive is removed. In addition, storage device picking mechanisms typically require a significant amount of time to align with, engage, and remove a storage device from a slot. This sequence of events is normally a slower operation than a slot-to-slot transport of a storage device within the library. Finally, the possibility of dropping storage devices while handling them in this manner is always present. Thus, an improved device for interfacing with and handling storage devices in an automated library is needed that is externally accessible.

In one type of RAID, the disk drives receive operational and data signals from the host computer through a fiber optic backplane. Typically, a single fiber optic cable extends along the backplane and is distributed to a series of fiber optic junctions. The fiber optic junctions must be readily equipped to detach from one disk drive and reattached to another since some of the drives will inevitably fail, and some applications require the drives to be frequently replaced. When a drive is removed from a junction, the junction must relay the optical transmission downstream with minimal losses. Unfortunately, each prior art, fiber optic junction typically causes about 6 dB in losses in the transmission of the signal. Thus, although prior art designs are workable, a more efficient optical junction for disk drive fiber optic cable backplanes is needed.

The power requirements of the disk drives in a RAID are typically provided through a hard-wired connector interface with the backplane. Although current power interface hardware is acceptable, an improved apparatus and method for powering to arrays of independent disk drives is desirable.

Finally, each disk drive carrier typically utilizes a cam mechanism in order to latch itself and the disk drive into a drawer. Unfortunately, the lever that operates the cam must be manually actuated to install or remove the drive carrier from the drawer. Thus, an improved mechanism for installing and removing drive carriers that alleviates the need for manual intervention is needed. Moreover, an automated library that satisfies each of the previously mentioned needs in the prior art would be desirable.

SUMMARY OF THE INVENTION

One embodiment of an automated disk drive library has a rack with drawers that are interconnected with a host computer. A drive carrier having a disk drive is mounted in each drawer. The drive carrier has a front bezel that senses whether the disk drive is latched within the drawer and communicates with the computer. The front bezel also has an optical source/sensor that may be coupled to an optical probe as an auxiliary data interface with computer. The main data interface for the disk drive is provided by a self-healing optical coupler at the back of the carrier and drawer. Power to the disk drive is supplied via a magnetic coupling with split core transformers on the drive carrier and drawer. The disk drive and carrier may be manually or automatically installed into and removed from drawer via a drive mechanism in the drawer.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

A first component of the present invention is a system and method of communicating to an overall automated library system when a computer interfaced device has been unlatched and about to be removed from the system. The first component is an automatic enable and disable system and method when a computer interfaced device has been respectively latched to or unlatched from an overall system. The first component is not in any way limited to the devices disclosed in this specification, and it may be used in conjunction with devices that are interfaced under various protocols, such as small computer system interface (SCSI), copper fiber or serial storage architecture (SSA), and fiber channel arbitrated loop (FCAL).

Figure 1:
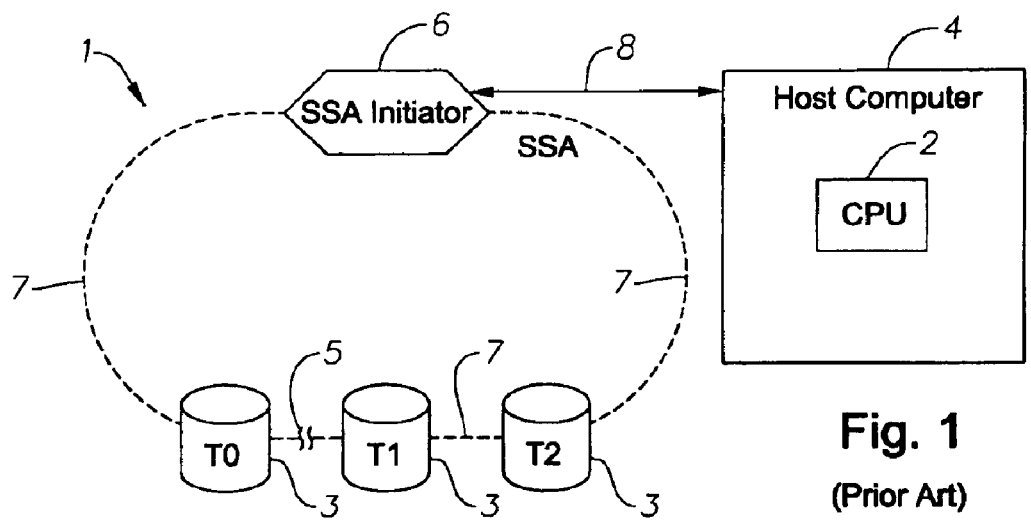
FIG. 1 is a block diagram of an overall RAID system with removable "hotpluggable" target disk drives that are serially linked together.
Figure 2:
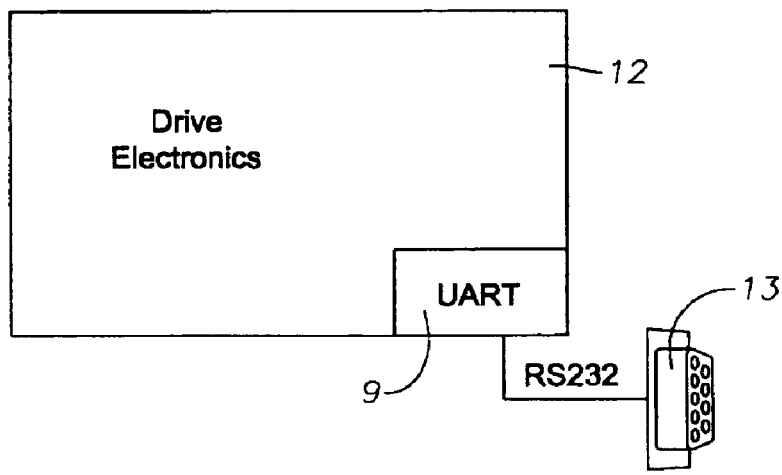
FIG. 2 is a schematic top view of a prior art hard disk drive.
Figure 3:
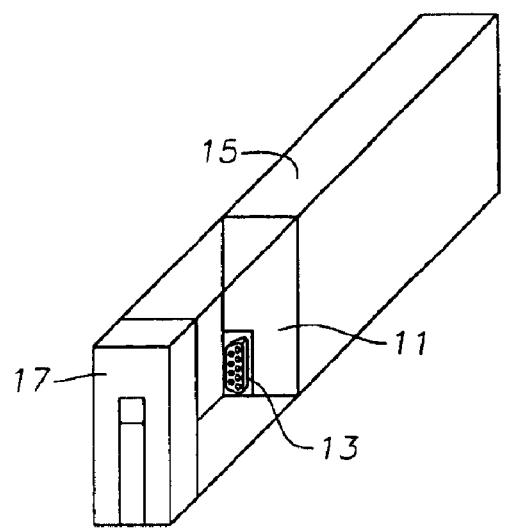
FIG. 3 is a schematic isometric view of the prior art drive of FIG. 2 mounted in a prior art drive carrier.
Figure 4:
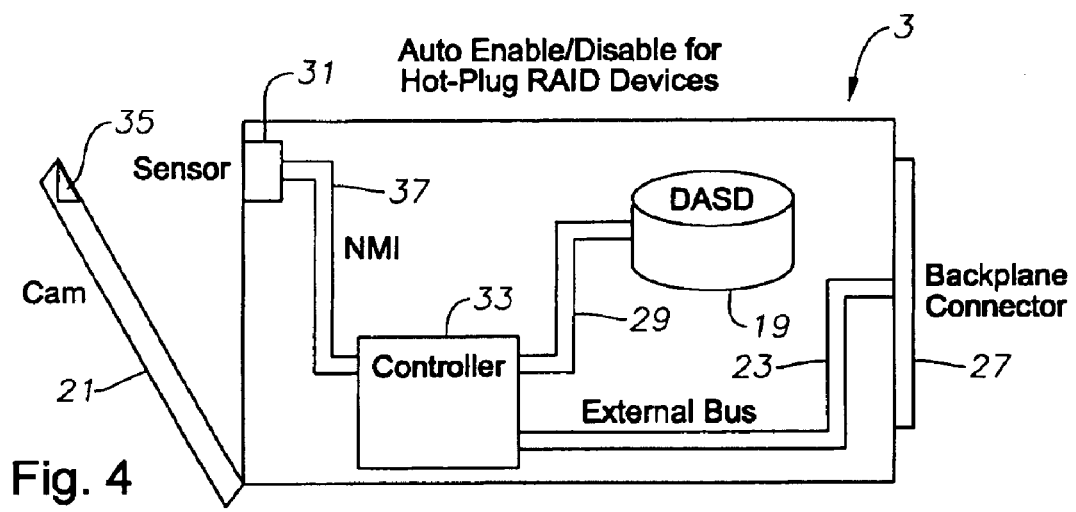
FIG. 4 is a block diagram of a first component for an automated library comprising an automatic enable and disable system and is constructed in accordance with the present invention.

Referring now to FIGS. 1 and 4, an overall copper/SSA or optical fiber RAID system 1 with removable "hot-pluggable" target disk drives 3 (T0, T1, and T2) are shown serially linked together. A cam mechanism or carrier lever 21 latches each of the target disk drives 3 into the drawer of the RAID system 1. The disk drives 3 are serially linked together to SSA initiator 6. The SSA RAID system 1 is coupled to and communicates with host computer 4 having CPU 2. When a target disk drive 3 is inserted into and latched to the drawer via cam 21 and the target disk drive 3 is linked to the SSA RAID system 1, the SSA initiator 6 is communicated with, which in turn communicates to the host computer 4 of the automated library, that such latching and linking of the target disk drive 3 exists.

When a target disk drive 3 is unlatched from the drawer, a message is sent within an immediate time frame, such as one second, from or over the target disk drive 3 to the SSA initiator 6 and in turn to the host computer 4 to know that unlatching of the target disk drive 3 has occurred and that removal of that target disk drive 3 is about to occur. A very short time frame, such as at least the immediate time frame amount or one second, exists between the time the cam mechanism is unlatched and the time when the back plane connection for that target disk drive 3 and the respective link 7 from the drive's connector 27 to the SSA initiator is broken at the time the target disk drive 3 is physically removed (see FIG. 4). A message is posted to the SSA initiator 6 reflecting such unlatching and removal of the target disk drive 3 or breaking of such connection. The automatic enable and disable system and method senses and communicates to the SSA initiator 6 and the host computer 4 the insertion of a target disk drive 3 into the SSA RAID system 1 or the breaking or linking of the connection and the respective removal of the disk drive 3 from the SSA RAID system 1.

With reference now to FIG. 4, the automatic enable and disable system and method for a removable interfaced device is shown in a target disk drive 3. A sensor magnet 35 is located on each disk drive cam 21, and a sensor 31 is coupled generally near each disk drive cam 21 to be engagable to the sensor magnet 35. The sensor 31 is coupled to the controller 33 of the target disk drive 3 via a non-maskable interrupt (NMI) 37, which is an interrupt communication that the controller 33 cannot postpone. As shown in FIGS. 1 and 4, the target disk drives 3 are each linked to the SSA initiator 6 via the link 7, and the SSA initiator 6 communicates with the host computer 4 via communication link 8. In FIG. 4, an external buss interface 23 links the controller 33 to a back plane connector 27. The back plane connector 27 provides outside communications to outside systems, devices, or persons, such as to the SSA initiator 6. Also, a direct access storage device (DASD) 19 is coupled to the controller 33 via link 29.

When a target disk drive 3 is inserted and linked to the SSA initiator 6 that is in communication with the host computer 4, the cam 21 is latched to a respective disk drive drawer. When this latching occurs, the sensor magnet 35 is engaged to the sensor 31. The sensor 31 senses and recognizes that the respective target disk drive 3 is latched and exists within the SSA RAID system 1. The sensor 31 sends communications to the controller 33 via the NMI 37 that the target disk drive 3 is latched and in tact. The controller 33, in turn, sends communication and messages to the SSA initiator 6 via the external buss 23, the back plane connector 27, and the link 7, which in turn sends communication and messages to the host computer 4 via link 8, that the respective target disk drive 3 is latched and in tact.

On the other hand, when a target disk drive 3 has been unlatched and about to be removed from the SSA RAID system 1 (i.e. about to be unlinked from the SSA initiator 6), the cam 21 is unlatched from its respective disk drive drawer. When this unlatching of the cam 21 occurs, the sensor magnet 35 is disengaged from the sensor 31. The sensor 31 senses and recognizes that the respective target disk drive 3 is unlatched and about to be removed from the SSA RAID system 1. The sensor 31 immediately sends communications to the controller 33 via the NMI 37 that the respective disk drive 3 has been unlatched and about to be removed. The controller 33, in turn, sends communication and messages to the SSA initiator 6 via the external buss 23, the back plane connector 27, and the link 7, which in turn sends communication and messages to the host computer 4 via link 8 that the respective target disk drive 3 is unlatched and will be removed.

Since the sending of the communications from the sensor 31 to the controller 33 cannot be postponed via NMI 37, the controller 33 is forced to immediately branch to a service routine to send communications to the SSA initiator 6 and the host computer 4 informing them of the fact that the respective disk drive 3 has been unlatched and will be removed. A message, such as an asynchronous alert message, is posted to the SSA initiator 6 and/or the host computer 4 advising it of the fact that the respective target disk drive 3 has been unlatched and will be removed. Since the host computer 4 immediately knows that the respective target disk drive 3 has been unlatched and then accordingly removed, then the host computer 4 avoids the execution of various routines and troubleshooting/search algorithms for identifying and finding a problem with the target disk drive 3 that has in fact been removed. The host computer 4 also avoids further inquiry of the removed target disk drive 3 as well.

In the preferred embodiment, sensor 31 is a hall-effect sensor, and sensor component 35 is a magnet. However, the sensor and sensor component are not in any way limited respectively to a hall-effect sensor and a magnet, and any type of sensors and sensor components, such as an optical sensor and light passage blocker or a mechanical sensor and mechanical sensor component, may be utilized.

Figure 5:
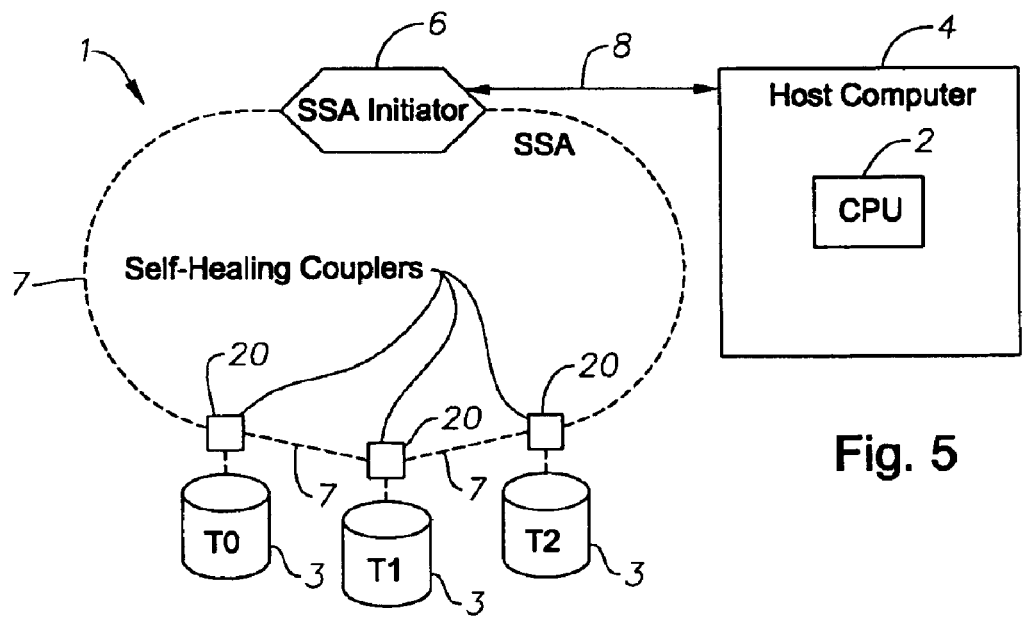
FIG. 5 is a block diagram of a second component of an automated library comprising self-healing couplers.

Referring now to FIG. 5, a second component of the present invention for automated libraries is shown as self-healing couplers 20. Couplers 20 couple and serially link target disk drives 3 (targets T0, T1, T2). Each self-healing coupler 20 acts as a switch. Each self-healing coupler 20 is switched to an "in-line" mode to couple the respective target disk drive 3 to the serial link 7 and to the other target disk drives 3 and the SSA initiator 6 when no break or problem in communication and link at the target disk drive 3 exists. On the other hand, each self-healing coupler 20 is switched to a "by-pass" mode to by-pass the respective target disk drive 3 and maintain the serial link 7 of the other target disk drives and the SSA initiator 6 when a break (such as break 5 in FIG. 1) or problem in communication and link at the target disk drive 3 exists.

Each self-healing coupler 20 also has an override system for manually controlling a serially linked device, such as the target disk drive 3, in a "by-pass" mode or an "in-line" mode.

Figure 6:
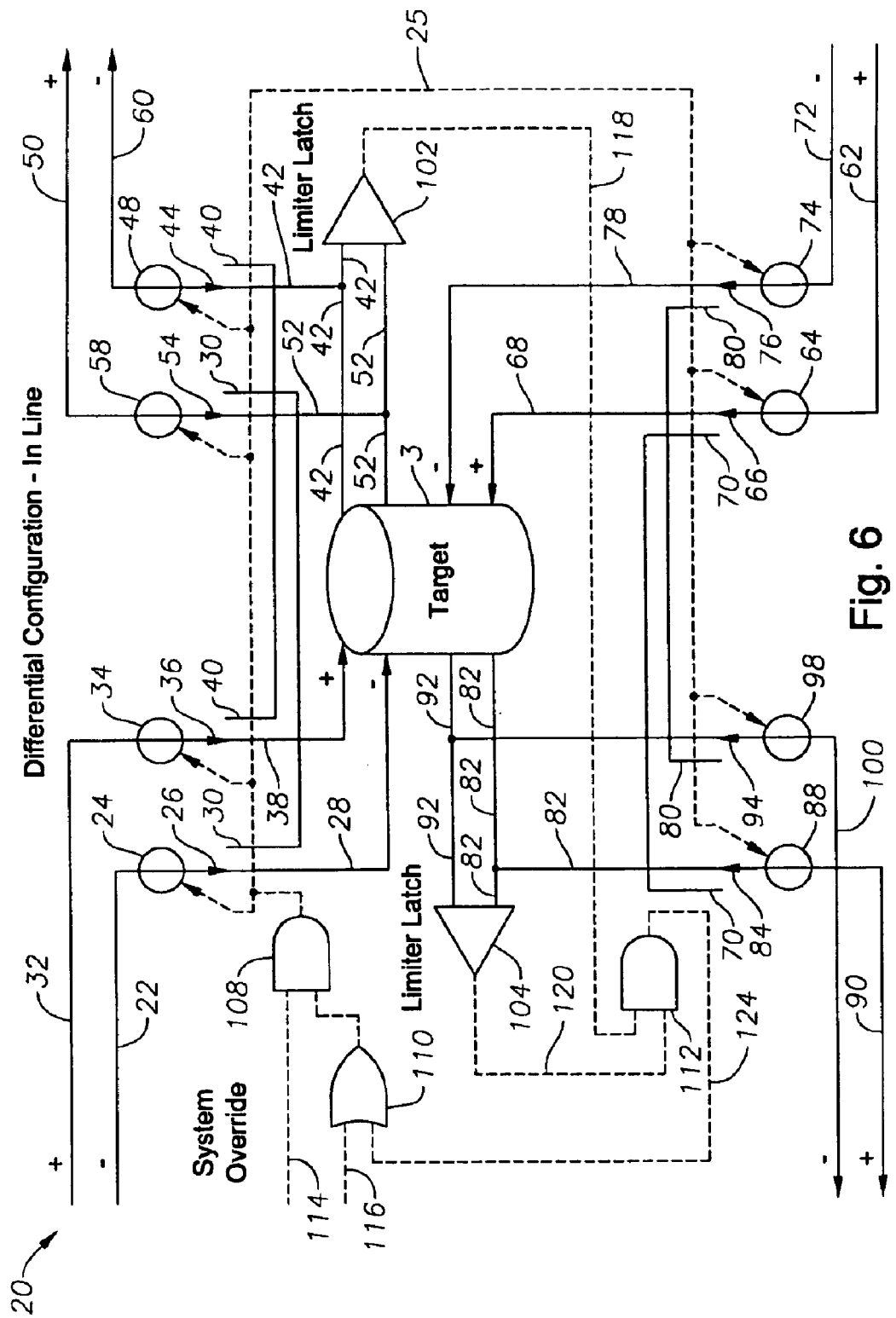
FIG. 6 is a detailed block diagram of one of the self-healing couplers of FIG. 5 in an "in-line" mode.
Figure 7:
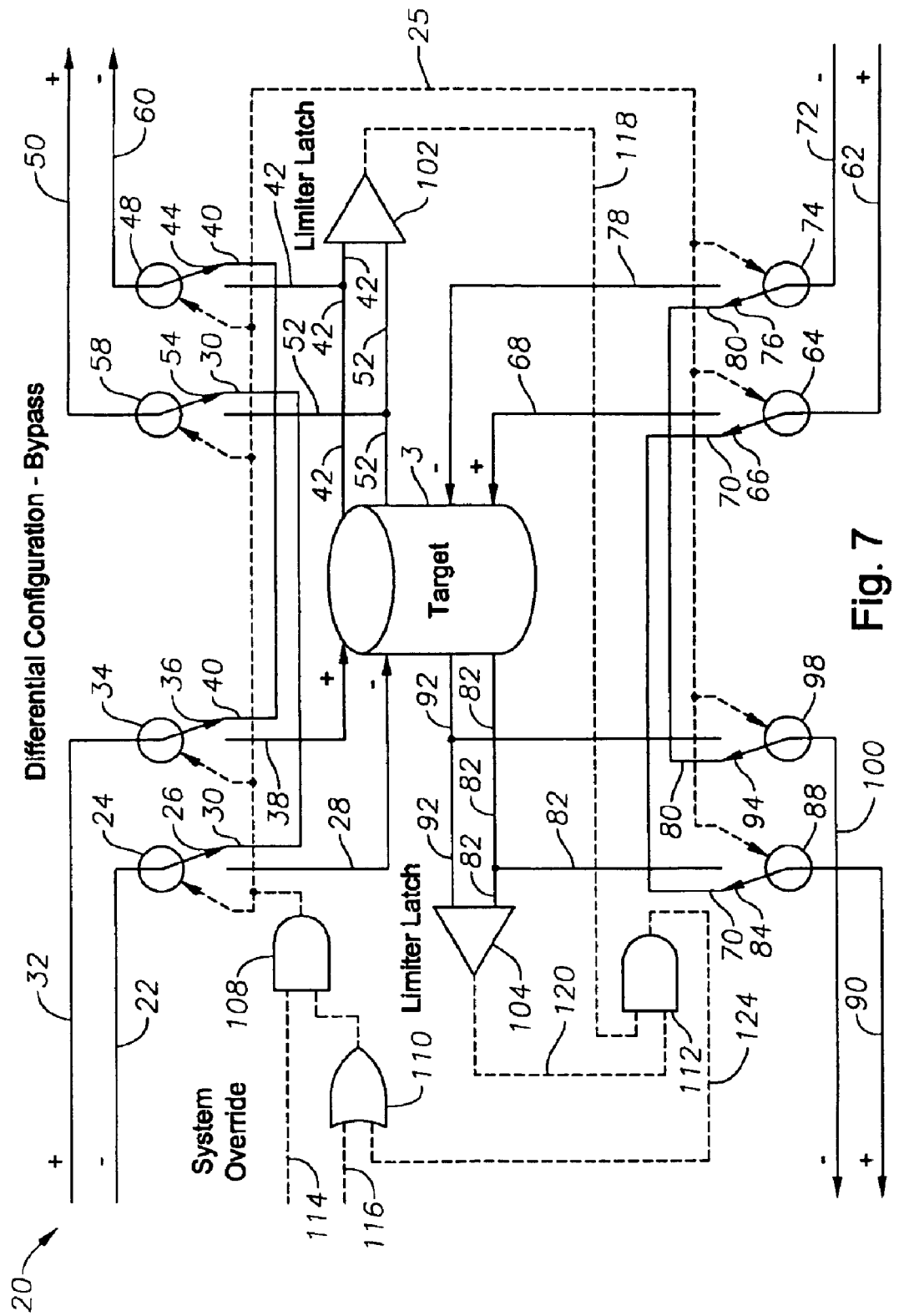
FIG. 7 is a detailed block diagram of one of the self-healing couplers of FIG. 5 in a "by-pass" mode.

FIG. 6 shows a detailed block diagram of a self-healing coupler 20 coupled to a target disk drive 3 wherein the self-healing coupler 20 is in the "in-line" mode, that is, the target disk drive 3 is "in-line" and serially linked to the other disk drives 3 and the initiator 6. FIG. 7 shows a detailed block diagram of a self-healing coupler 20 coupled to a target disk drive 3 wherein the self-healing coupler 20 is in the "bypass" mode, that is, the target disk drive 3 is "by-passed" and the other disk drives 3 and the initiator 6 are maintained as serially linked together. The self-healing coupler 20 has a quad-pole, double throw switch 25.

The target disk drive 3 has bi-directional communication lines. The target disk drive 3 has one direction of communication lines running from an input series of positive lines from line 32 to line 38 and an output series of positive lines from line 42 to line 50 and an input series of negative lines from line 22 to line 28 and an output series of negative lines from line 52 to line 60. The target disk 3 also has another direction of communication lines running from an input series of positive lines from line 62 to line 68 and an output series of lines from line 82 to line 90 and an input series of negative lines from line 72 to line 78 and an output series of negative lines from line 92 to line 100.

A switching device is coupled to each of the input and output series of lines. FIGS. 6 and 7 show switching device 34 coupled to line 32, switching device 48 coupled to line 50, switching device 24 coupled to line 22, switching device 58 coupled to line 60, switching device 64 coupled to line 62, switching device 88 coupled to line 90, switching device 74 coupled to line 72, and switching device 98 coupled to line 100. A switch coupler 36 of switch device 34 is able to switch coupling line 32 between line 38 (in-line mode) and by-pass line 40 (by-pass mode) while a switch coupler 44 of switch device 48 is able to switch coupling line 50 between line 42 (in-line mode) and by-pass line 40 (by-pass mode). A switch coupler 26 of switch device 24 is able to switch coupling line 22 between line 28 (in-line mode) and by-pass line 30 (by-pass mode) while a switch coupler 54 of switch device 58 is able to switch coupling line 60 between line 52 (in-line mode) and by-pass line 30 (by-pass mode). A switch coupler 66 of switch device 64 is able to switch coupling line 62 between line 68 (in-line mode) and by-pass line 70 (by-pass mode) while a switch coupler 84 of switch device 88 is able to switch coupling line 90 between line 82 (in-line mode) and by-pass line 70 (by-pass mode). A switch coupler 76 of switch device 74 is able to switch coupling line 72 between line 78 (in-line mode) and by-pass line 80 (by-pass mode) while a switch coupler 94 of switch device 98 is able to switch coupling line 100 between line 92 (in-line mode) and by-pass line 80 (by-pass mode).

The switch 25 is coupled to each of the switch devices 34, 48, 24, 58, 64, 88, 74, and 98. The switch 25 is controlled to place the target disk drive 3 in either an "in-line" mode or a "by-pass" mode. The self-healing coupler 20 determines whether serial data is constantly or still going through the target disk drive 3. The self-healing coupler 20 examines the output communication streams from the target disk drive 3, that is, the output series of communication lines. Output series of communication lines 42 and 52 from the target disk drive 3 are inputted into a limiter latch 102, and output series of communication lines 82 and 92 are inputted into a limiter latch 104. The limiter latches 102 and 104 look for the constant serial data stream (8 to 10 bit encoding scheme). The output 118 from limiter latch 102 and the output 120 from limiter latch 104 are inputted into a series of logic gates to control the switch 25 in either an "in-line" mode or a "by-pass" mode. FIGS. 6 and 7 show an example of such series of logic gates. The outputs 118 and 120 from the limiter latches 102 and 104 are inputted into an AND gate 112. The output 124 of the AND gate 112 is inputted into an OR gate 110. Override system control is an input 116 into the OR gate 110. The output of the OR gate 110 is inputted into another AND gate 108. Another override system control is an input 114 into the AND gate 108 as well.

If the limiter latches 102 and 104 detect data stream flowing through the target disk drive 3, then they send signals to the series of logic gates to maintain or switch the switch 25 in the "in-line" mode. The switch 25 is maintained in or switched to the "in-line" mode as shown in FIG. 6. The switch couplers 36, 44, 26, and 54 of switch devices 34, 48, 24, and 58 are positioned or switched to respectively couple the lines 32 and 38, the lines 42 and 50, the lines 22 and 28, and the lines 52 and 60 in "in-line" communication. Furthermore, the switch couplers 66, 84, 76, and 94 of switch devices 64, 88, 74, and 98 are positioned or switched to respectively couple the lines 62 and 68, the lines 82 and 90, the lines 72 and 78, and the lines 92 and 100 in "in-line" communication. Therefore, the lines of communications for the target disk drive 3 shown in FIG. 6 are in "in-line" communications.

On the other hand, if the limiter latches 102 and/or 104 detect no data stream flowing through the target disk drive 3, then the latch(es) 102 and/or 104 send signals to the series of logic gates to maintain or switch the switch 25 to the "by-pass" mode. The switch 25 is maintained in or switched to the "by-pass" mode (FIG. 7). The switch couplers 36, 44, 26, and 54 of switch devices 34, 48, 24, and 58 are positioned or switched to respectively couple the line 32 and by-pass line 40, the line 50 and bypass line 40, the line 22 and by-pass line 30, and the line 60 and by-pass line 30 in "by-passing" communication to and from the target disk drive 3 while allowing other devices to be maintained in serial link through the by-pass lines 40 and 30. Furthermore, the switch couplers 66, 84, 76, and 94 of switch devices 64, 88, 74, and 98 are positioned or switched to respectively couple the line 62 and by-pass line 70, the line 90 and by-pass line 70, the line 72 and by-pass line 80, and the line 1100 and by-pass line 80 in "by-passing" communication to and from the target disk drive 3 while allowing other devices to be maintained in serial link through the by-pass lines 70 and 80. Therefore, the lines of communications for the target disk drive 3 shown in FIG. 7 have been by-passed and the other devices are maintained in serial link to each other through the by-pass lines 30, 40, 70, and 80.

The self-healing coupler 20 has a system for overriding the automatic coupling of the target disk drive 3 in a respective "in-line" or "by-pass" mode. The self-healing feature of the coupler 20 is overridden by placing appropriate override values at input 114 of the AND gate 108 and at input 116 of the or gate 110. The overriding of the self-healing coupler 20 allows a system or person to control and maintain the respective target disk drive 3 in a desired "in-line" or "by-pass" mode instead of allowing the self-healing coupler 20.

Figure 10:
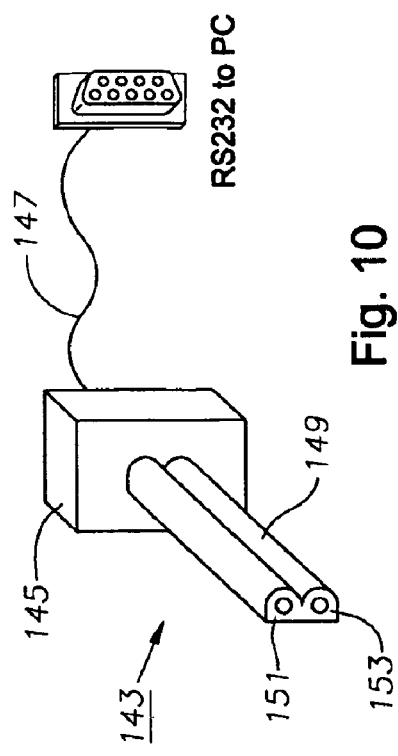
FIG. 10 is an isometric view of an optical probe for the disk drive and disk drive carrier of both FIGS. 8 and 9.
Figure 8:
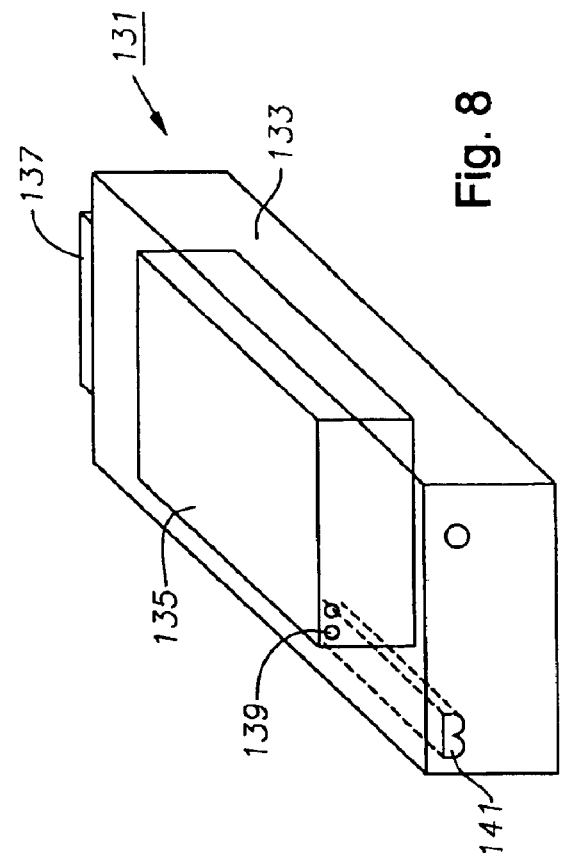
FIG. 8 is an isometric view of a disk drive having one version of a third component of the library comprising an optically-coupled service interface.
Figure 9:
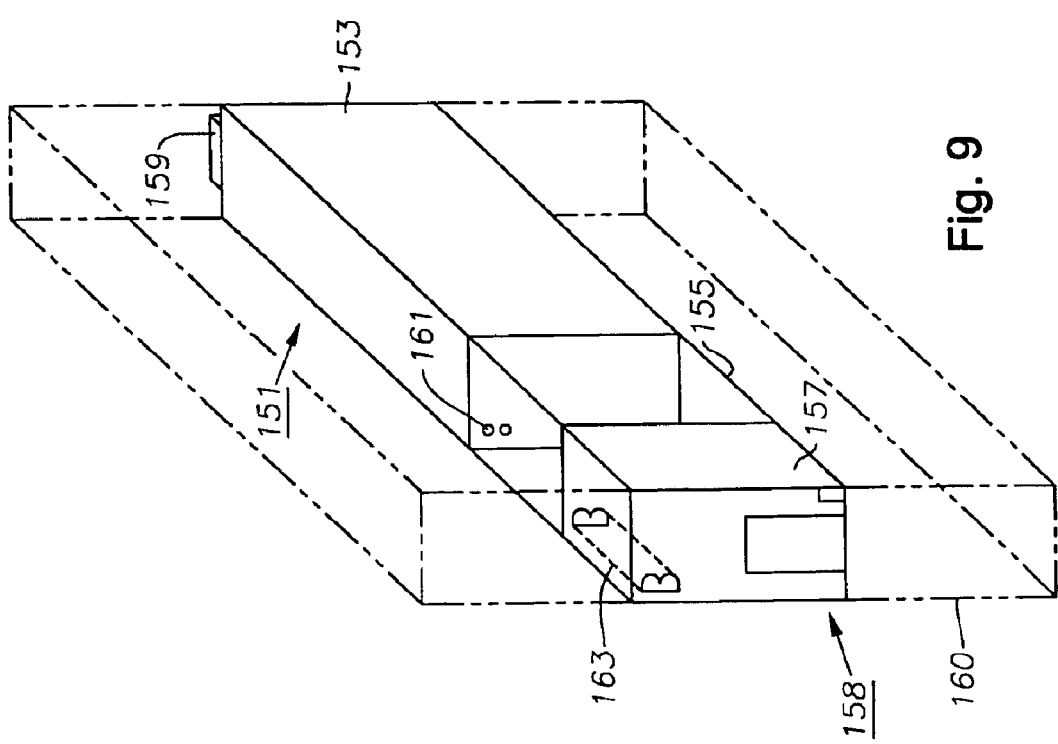
FIG. 9 is an isometric view of another version of the service interface for the disk drive of FIG. 8.

Referring to FIGS. 8–10, a third component of the automated library comprising optically-coupled component service interfaces is shown. For purposes of C) illustration, a data access and storage device such as a computer hard disk drive 131 (FIG. 8) is described. However, this component also may be applied to various other elements as well, such as a computer mainframe, tape drives, solid state memory, and optical devices. Disk drive 131 has a body 133 containing a drive circuit card 135 and other electrical devices such as those commonly known in the art for accessing and storing data. A drive interface connector 137, such as a small computer system interface (SCSI) connector, is electrically interconnected and mounted to drive 131 for interfacing with a host computer adjacent to a rear end of drive 131.

Drive 131 also has a small optical connector or source and sensor pair 139 mounted to circuit card 135 inside body 133. In the embodiment shown, optical source and sensor pair 139 is located opposite SCSI connector 137, adjacent to the front end of drive 131. In the preferred embodiment, pair 139 comprises an LED and a phototransistor for a driver and a receiver, respectively. The optical source and sensor pair 139 are interconnected with drive 131 so as to provide an RS232-type interface with drive 131. The LED of pair 139 provides optical output signals, and the phototransistor of pair 139 receives optical input signals. In addition, the front end on body 133 of drive 131 has a small keyed hole 141 extending therethrough that aligns with optical source and sensor pair 139. Hole 141 may comprise many different shapes, but is shown in a generally B-shaped configuration.

Referring now to FIG. 10, an external optical probe 143 for drive 131 is shown. Optical probe 143 has a base 145 from which extends an RS232-type connector 147 for interfacing with a maintenance and/or service personal computer. An elongated shaft 149 also extends from base 145. Shaft 149 has a generally B-shaped profile when viewed from the end, but may be provided in other shapes as well. In the embodiment shown, an LED 151 and a phototransistor 153 are mounted to the end of shaft 149, and are interconnected with connector 147.

In operation, drive 131 may be monitored or serviced via optical source and sensor pair 139 without removing drive 131 from its host computer, or interrupting its operation in any manner. A technician inserts the shaft 149 of probe 143 into hole 141 in body 133. The shapes of shaft 149 and hole 141 are complementary in shape, and are keyed in such a manner so as to prevent misinsertion and/or misalignment. When base 145 of probe 143 abuts body 133 of drive 131, the LED 151 and phototransistor 153 of probe 143 are perfectly aligned with and in close proximity to the phototransistor and LED of optical source and sensor pair 139, respectively. The technician can then exchange information with drive 131 via the optical connection.

Referring now to FIG. 9, another version of the third component of the automated library is shown as a hard disk drive assembly 151 comprising a disk drive 153 mounted in a carrier 155 having a cosmetic bezel 157. Carrier 155 is mounted in the drawer 160 of a storage subsystem 158. Assembly 151 is ideally suited for use in a redundant array of independent disk drives (RAID) (shown in dashed lines) for a host computer. Drive 153 electrically interfaces with the host computer via an electrical connector 159, such as a SCSI device. Like drive 131, drive 153 is provided with an optical source and sensor pair 161, and bezel 157 is provided with a small keyed hole 163. Pair 161 and hole 163 are identical to their predecessors.

Likewise, in operation, drive assembly 151 may be monitored or serviced via optical pair 161 without removing drive 153 from its host computer, or interrupting its operation in any manner. A technician inserts the shaft 149 of probe 143 (FIG. 10) into hole 163 in bezel 157. The shapes of shaft 149 and hole 163 are complementary in shape. When base 145 of probe 143 abuts bezel 157, the LED 151 and phototransistor 153 of probe 143 are perfectly aligned with and in proximity to the phototransistor and LED of optical source and sensor pair 161, respectively. The technician can then exchange information with drive 153 via the optical connection. Note that probe 143 may be used to access all of the drives in the array of drives.

Figure 11:
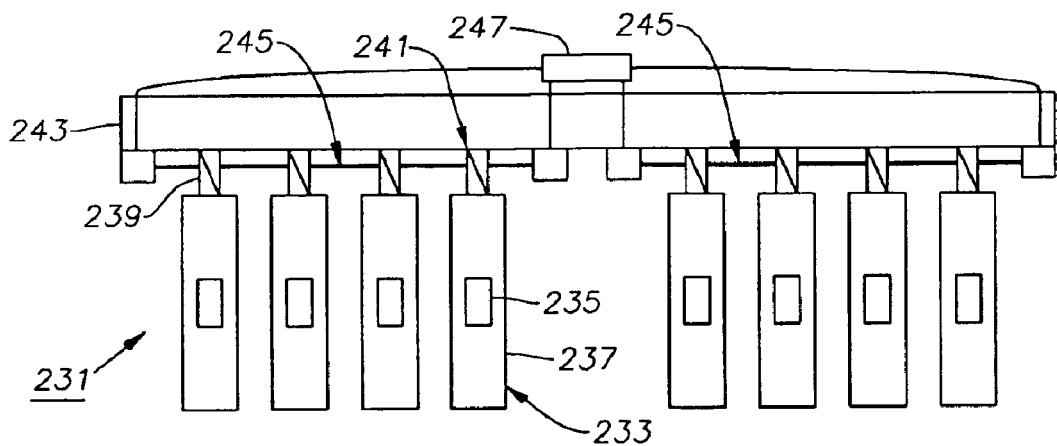
FIG. 11 is a schematic drawing of an array of independent disk drives having a fourth component of an automated library comprising a fiber optic backplane.
Figure 12:
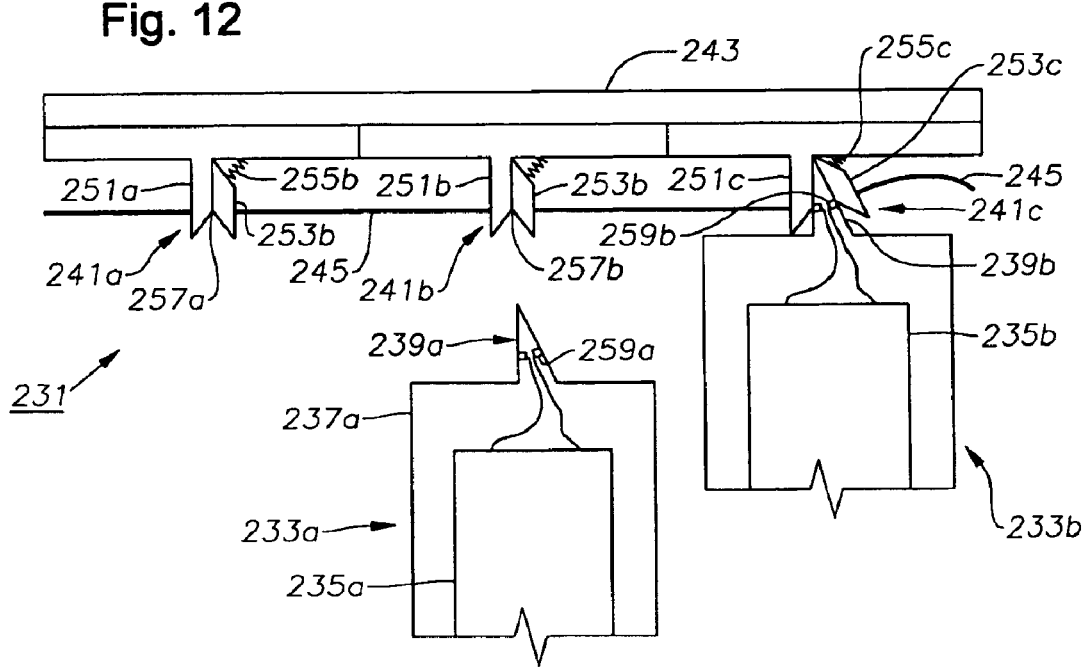
FIG. 12 is an enlarged drawing of a portion of the disk drives and fiber optic backplane of FIG. 11.

Referring now to FIGS. 11 and 12, a fourth component of the automated library comprises a system and method for forming self-healing optical couplings at the backplane. For purposes of illustration, a computer data access and storage device such as a disk drive storage subsystem 231 is described. However, the system and method of the present invention may also be applied to other equipment as well, such as a computer mainframe, tape drives, solid state memory, and optical devices.

In the embodiment shown, subsystem 231 comprises a redundant array of independent disk drive assemblies 233, each of which is located in a drawer. Each disk drive assembly 233 contains one disk drive 235 such as those commonly known in the art for accessing and storing data. Each disk drive 235 is mounted to and carried by a tray or carrier 237 for ease of inserting and removing disk drives 235 relative to the drawers. Each carrier 237 is provided with a fiber optic communications interface 239 for interfacing with a mating fiber optic junction or interface connector 241 on a component or optical backplane 243. Connectors 241 are substantially equal in number to the number of drive assemblies 233 and interconnected in series through a main fiber optic cable 245 with a host computer 247. Data is accessed and stored on disk drives 235 by computer 247 via operational signals sent through the optical circuit on backplane 243, cable 245, and connectors 241.

As shown in FIG. 12, disk drive assemblies 233 are readily equipped to detach from one fiber optic interface connector 241 and reattach to another since some applications require drive assemblies 233 to be frequently replaced. Each connector 241 comprises a stationary base 251, a movable door 253, and a springloaded hinge 255 therebetween. Hinge 255 pivots and biases door 253 to a closed position (see connectors 241*a*, 241*b*) for closing the optical circuit, but allows door 253 to move to an inclined open position as well (see connector 241*c*) for exposing a connection point in the optical circuit. Cable 245 extends and is joined to each base 251 and door 253, such that a single optical joint between an optical transmitter/receiver pair 259 is formed when door 253 is in the closed position. When door 253 is in the closed position, the single joint formed in connector 241 transmits the undriven optical signal to the next connector 241 with a maximum loss of 3 dB per connector 241, but the loss will most likely fall within the range of approximately 1 to 3 dB per connector 241.

The end of each connector 241 is provided with a tapered groove 257 for receiving the interface 239 of one of the drive assemblies 233. Groove 257 is defined between each paired base 251 and door 253. Interfaces 239 have tapers that are complementary in shape to grooves 257 so that drive assemblies 233 may be easily inserted into and removed from connectors 241. As illustrated at connector 241c on the right side of FIG. 12, the tip of interface 239b of drive assembly 233b plugs between base 251c and door 253c. Optical transmitter/receiver pair 259b located within interface 239b registers and aligns with the ends of cable 245 inside connector 241c. The optical transmission on cable 245 is received by drive 235b and then transmitted downstream with no signal losses since the signal is redriven at drive 235b. The signal is similarly handled at each drive 235 in the series. When a drive assembly 233 is removed from a junction (such as drive 233a from junction 241b), door 253b pivots back into contact with base 251b to close the connection and allow the optical transmission to continue downstream on cable 245.

Figure 13:
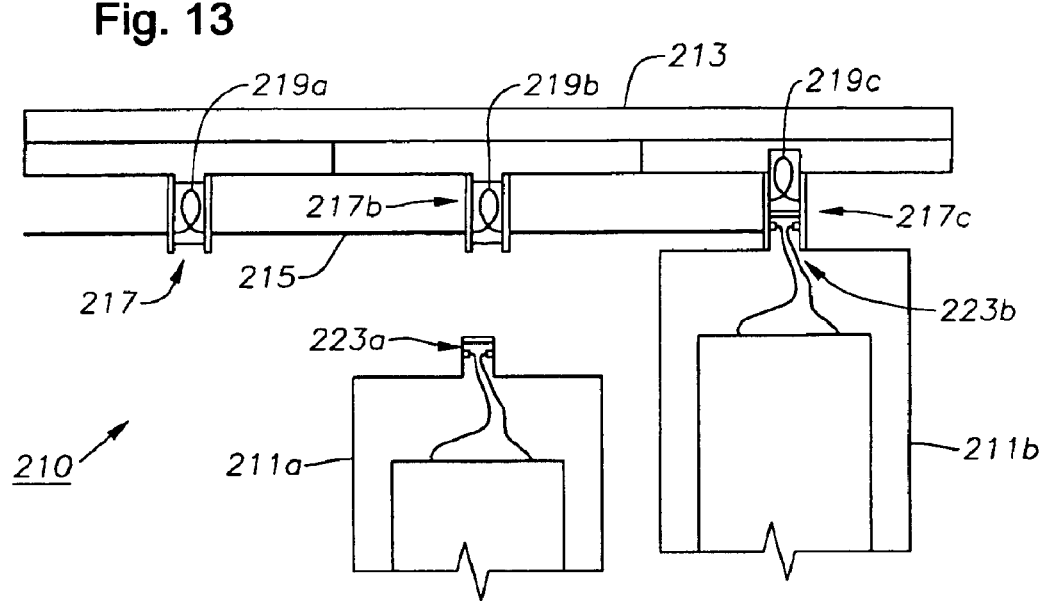
FIG. 13 is a schematic drawing of another version of the disk drives and fiber optic backplane of FIG. 11.

Referring now to FIG. 13, another version of the fourth component of the automated library is illustrated for a storage subsystem 210 of hard disk drives. Subsystem 210 is substantially identical to subsystem 231 except for its optical connections. The individual disk drives 211 receive operational signals from the host computer through a fiber optic backplane 213. A single fiber optic cable 215 extends along the backplane and is distributed to a series of fiber optic junctions 217 that are equal to the number of disk drives 211. Like junctions 241, junctions 217 are equipped to detach from one disk drive 211 and reattached to another since some applications require drives 211 to be frequently replaced.

Fiber optic junction 217 for backplane 213 uses a small loop 219 of fiber optic cable. Each end of a loop 219 movably registers with main cable 215. When drive 211b is plugged into junction 217c, the loop 219c is displaced from the interface, and the fiber optic connector 223b on drive 211b is inserted in its place. Connector 223b has two fiber optic ends that register with the two ends of main cable 215 at junction 217c so that the optical transmission on cable 215 may be received by drive 211b and then transmitted downstream to the other drives 211 in series without losses in the signal. When a drive is removed from a junction (such as drive 211a from junction 217b), the loop 219b moves back into the junction 217b so that the transmission continues downstream. The two fiber optic ends required by this type of fiber optic junction causes a maximum loss of 3 dB in signal per end, or 6 dB per junction.

Figure 14:
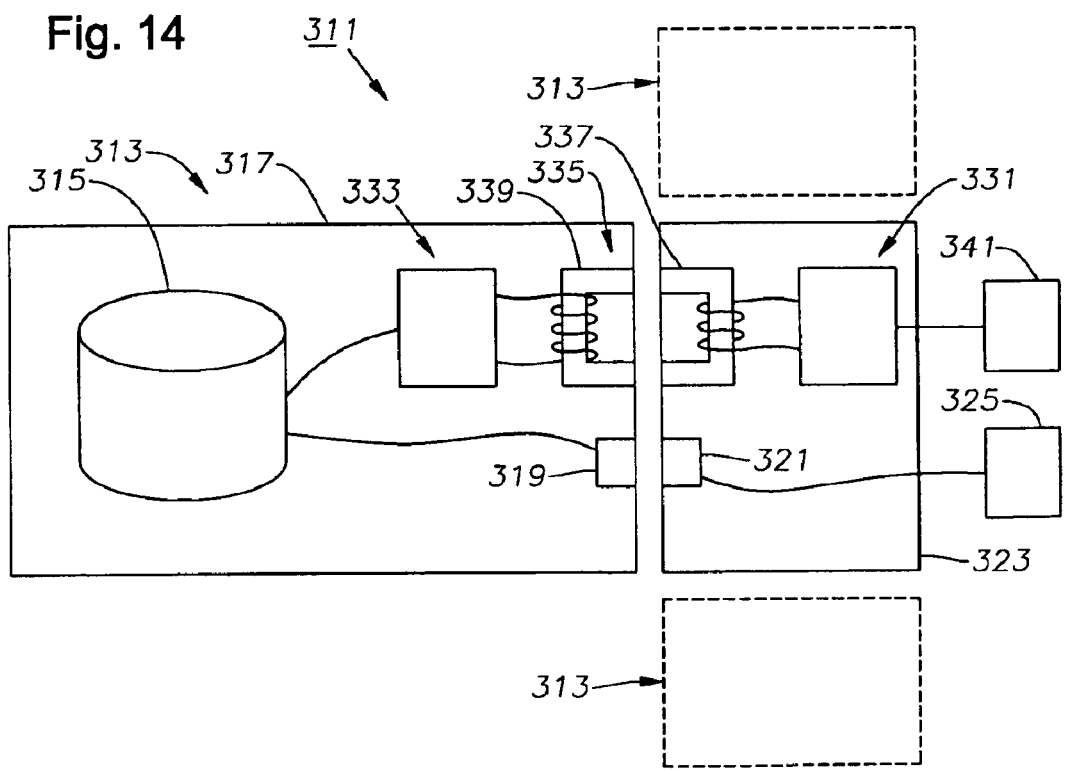
FIG. 14 is a schematic drawing of a fifth component of an automated library comprising a power coupling.

Referring now to FIG. 14, a fifth component of the automated library comprising a system and method distributing power is shown. In the version shown, a storage subsystem 311 has RAID assemblies 313, each of which is located in a drawer. Three identical assemblies 313 are shown, however, two of the assemblies 313 are shown schematically with dashed lines. Each disk drive assembly 313 is hermetically sealed and contains one component or disk drive 315. Each disk drive 315 is mounted to and carried by a tray or carrier 317 for ease of inserting and removing disk drives 315 relative to the drawers in subsystem 311. Each carrier 317 is provided with a communications interface 319, such as a SCSI connector, for interfacing with a mating interface connector 321 on an electrical backplane 323. Interface connector 321 on backplane 323 is electrically connected to a host computer 325.

Backplane 323 also comprises a main power conditioning circuit 331 for interfacing with a power conditioning and distribution circuit 333 on each of the disk drive assemblies 313. Each paired main power conditioning circuit 331 and power conditioning and distribution circuit 333 are associated with and interface via a connectorless magnetic coupling 335 having a split core transformer 337, 339, respectively. The cores or portions of split core transformer 337, 339 are individually and hermetically sealed and, thus, free of physical contact. Split core transformer 337, 339 may comprise either a linear or switching transformer. The main power conditioning circuits 331 deliver power to split core transformer 337 from an electrical power source 341.

When disk drive assembly 313 is located adjacent to, inserted into, or otherwise in close proximity to storage subsystem 311, split core transformer 337 magnetically couples with split core transformer 339 to deliver electrical power to power conditioning and distribution circuit 333 on carrier 317. This magnetic coupling is connectorless and occurs without physical contact between the components. Consequently, circuit 333 provides power to its respective drive 315 via their magnetically coupled interconnection.

Figure 15:
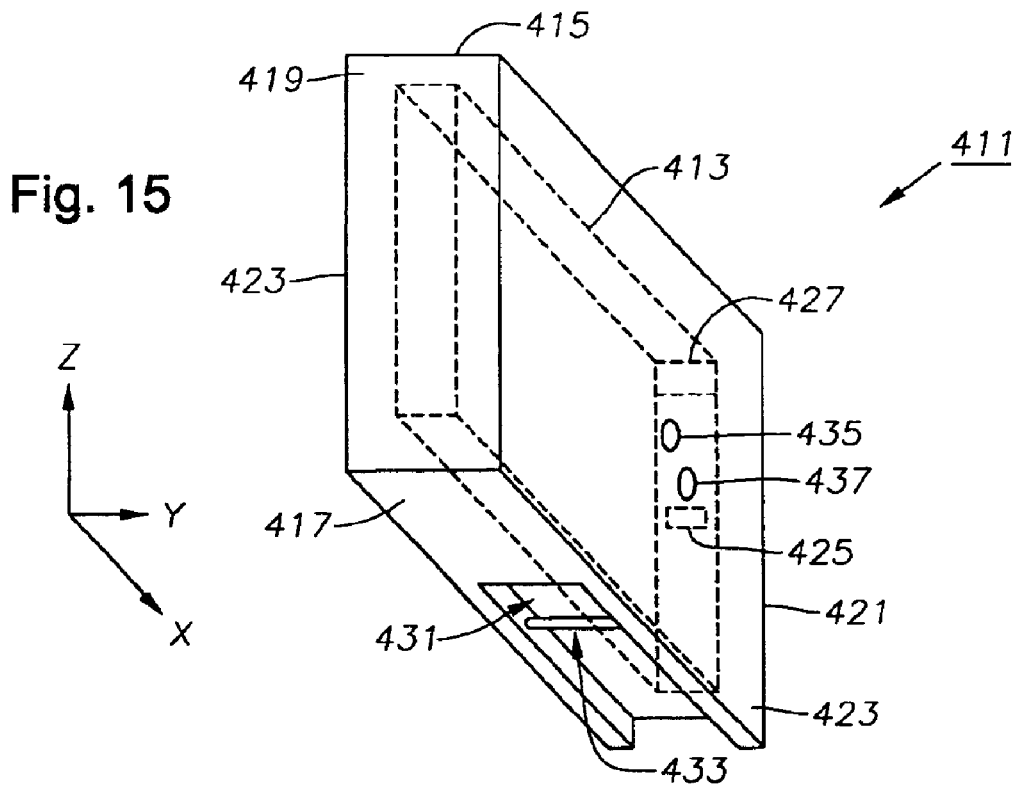
FIG. 15 is a bottom isometric view of a sixth component of an automated library comprising a drive carrier engagement and release mechanism.

Referring to FIG. 15, a sixth component of the automated library comprises a drive carrier engagement and release mechanism. A carrier 411 supports a disk drive 413 that may be hermetically sealed for protection and portability. Carrier 411 has generally rectangular features, including a top 415, a bottom 417, a front 419, a rear 421, and sidewalls 423 extending therebetween. In the preferred embodiment, carrier 411 and/or drive 413 has optical signal connector 425 and magnetic power coupling 427 located at or near rear 421. In addition, bottom 417 is provided with a generally rectangular trough or recess 431 that extends in an x-y plane forward from rear 421. A pin 433 is transversely mounted in recess 431 such that it extends in a y-direction. A pair of small elements such as magnets 435, 437 are also mounted to carrier 411, preferably near rear 421.

Carrier 411 is designed to be slidably mounted in the slot or receptacle of a drawer 441 (FIG. 16) of automated library or computer system 443. Like carrier 411, drawer 441 has generally rectangular features, including a top 445, a bottom 447, a front 449, a rear 451, and sidewalls 453 extending therebetween. Drawer 441 has a self-healing optical signal connector 455, a magnetic power coupling 457, and an optical, magnetic, or Hall-Effect sensor 459, all located at or near rear 451. Connector 455 and coupling 457 interconnect with connector 425 and coupling 427, respectively, while sensor 459 detects magnets 435, 437. Front 449 has an drive eject button 460 for manually ejecting carrier 411.

Figure 16:
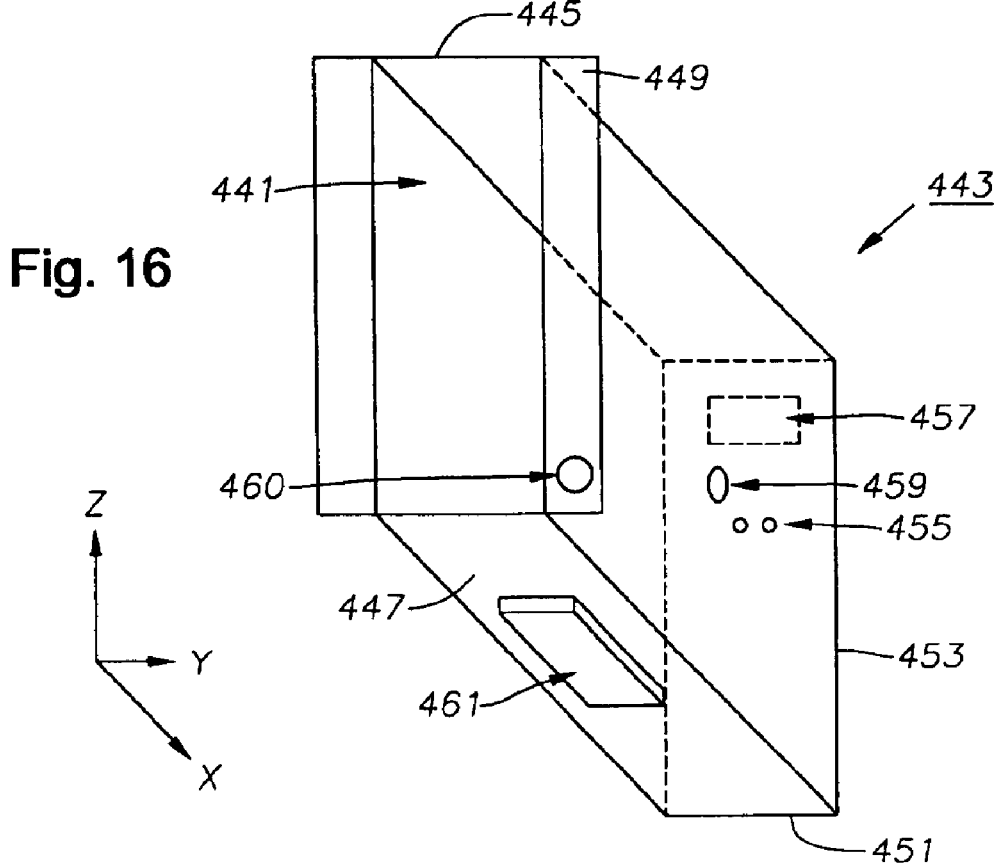
FIG. 16 is a bottom isometric view of a drawer used in conjunction with the drive carrier engagement and release mechanism of FIG. 15.
Figure 17:
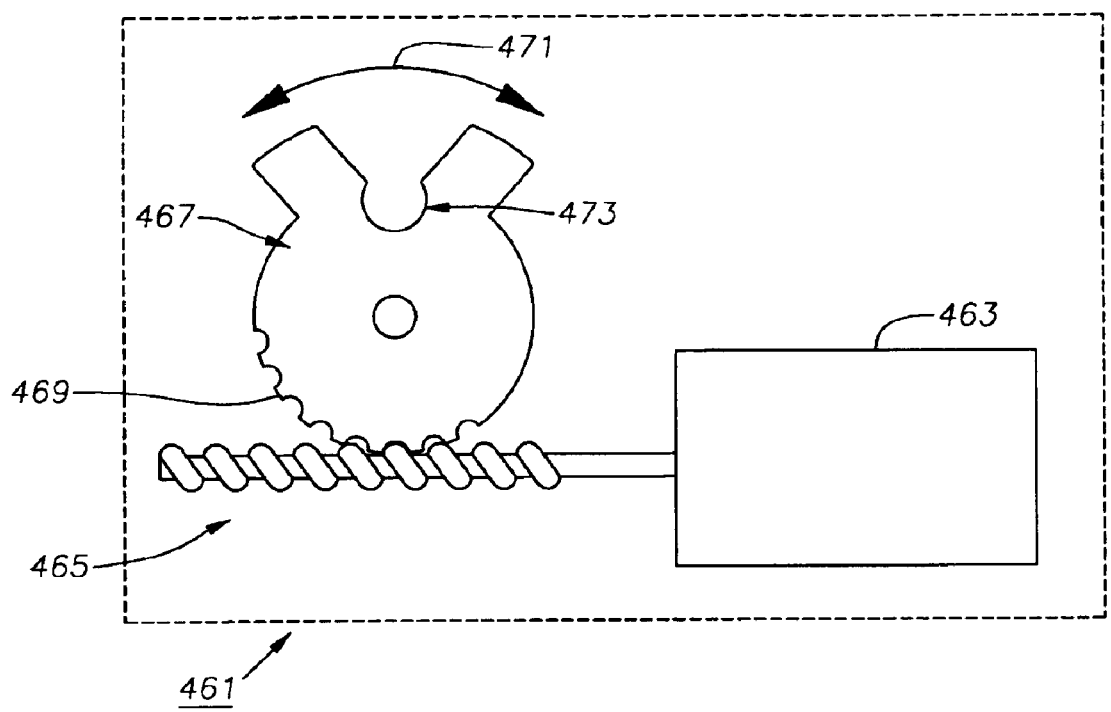
FIG. 17 is a schematic drawing of a driving device utilized by the drawer of FIG. 16.

Referring now to FIGS. 16 and 17, bottom 447 of drawer 441 includes a drive mechanism 461 that extends in an x-y plane forward from rear 421. In the preferred embodiment, drive mechanism 461 comprises a motor 463 that drives a worm gear 465, and a pivotally mounted cam 467 having a peripheral worm gear drive 469 driven by worm gear 465. Cam 467 moves in the directions shown by arrows 471, and also has a registration hole 473 for engaging pin 433 on carrier 411.

Figure 18:
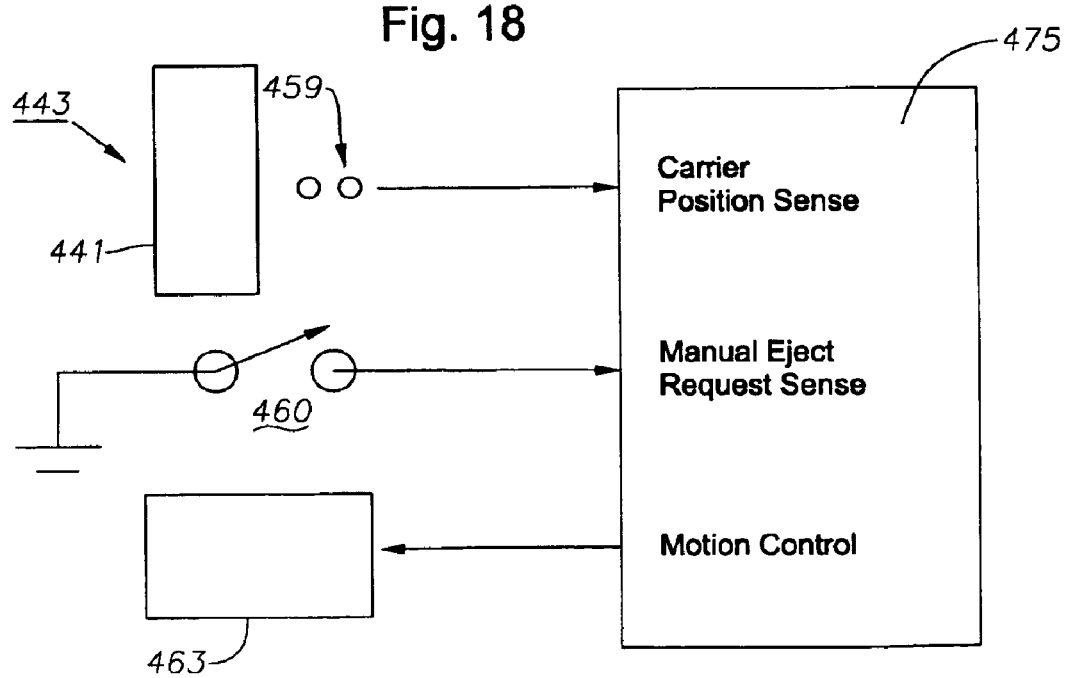
FIG. 18 is an operational diagram of the disk drive carrier and drawer of FIGS. 16 and 17.

In operation (FIG. 18), computer system 443 utilizes a controller 475 for monitoring and controlling the previously described components. Although the drive assembly of carrier 411 may be manually inserted into and interconnected with drawer 441, and manually removed and disconnected therefrom by depressing eject button 460, system 443 can also perform these functions automatically. The automated sequence is accomplished by inserting carrier 411 into the receptacle of drawer 441 only until pin 433 (FIG. 15) contacts and engages registration hole 473 (FIG. 17) in drive mechanism 461. The user will physically sense this contact. At this point, Hall-Effect sensor 459 senses magnet 435 (FIG. 15) and signals controller 475. Controller 475 then actuates motor 463 (FIG. 17) which drives worm gear 465 to rotate cam 467. The rotation of cam 467 pulls carrier 411 completely into drawer 441 such that carrier 411 is fully seated in drawer 441, and power connectors 425, 455 magnetically couple and signal couplings 427, 457 interconnect. Proper registration of carrier 411 in drawer 441 is verified by Hall-Effect sensor 459 sensing magnet 437, which terminates movement of carrier 411 relative to drawer 441. Disk drive 413 is fully operational in computer system 443 at this point.

To disconnect and remove carrier 411 (and, thus, drive 413) from drawer 441, the user pushes eject button 460 to reverse the previously described sequence. Actuation of eject button 460 signals controller 475 to reverse motor 463, which will rotate cam 467 in the opposite direction to push pin 433 and carrier 411 partially out of drawer 441. The user may then grasp carrier 411 and fully extract it from drawer 441. Alternatively, controller 475 can automatically eject carrier 411 under some circumstances. For example, if drive 413 experiences a disruption in service, is intermittent, or is experiencing other problems, controller 475 can eject carrier 411 and signal an operator or request maintenance.

Figure 20:
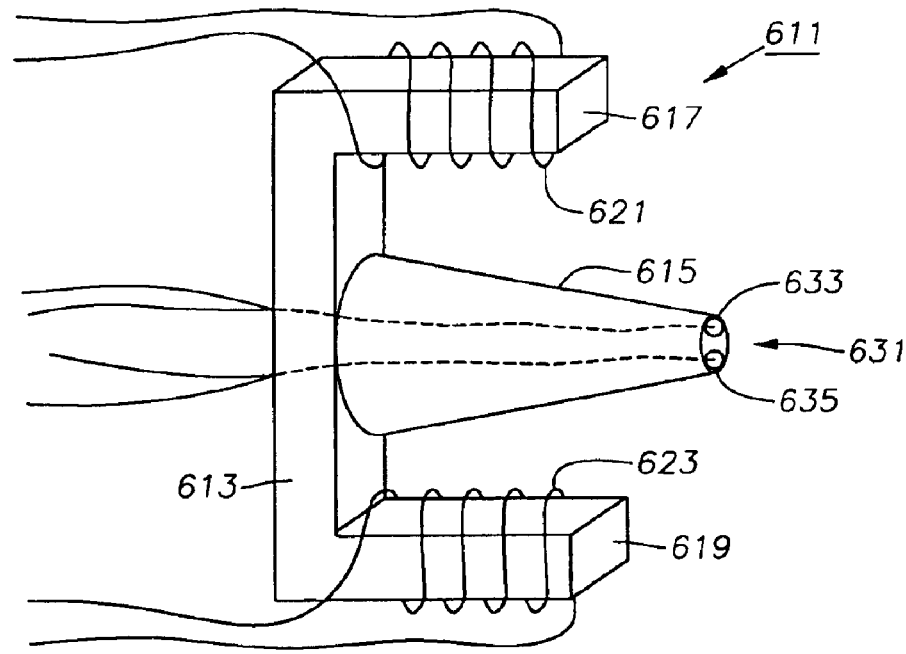
FIG. 20 is an isometric view of an alternate embodiment of the third component of the automated disk drive library comprising a magnetic picker with a service interface.

Referring now to FIG. 20, a picking tool 611 for an automated library of disk drive carriers is shown. Picking tool 611 has securing means in the form of an electromagnetic body 613, and an interface means in the form of a rigid guide pin 615 protruding from body 613. Body 613 is a generally C-shaped element that is formed from a ferrous material. A pair of electromagnets 617, 619 extend from body 613 in the same direction as guide pin 615. In the embodiment shown, electromagnets 617, 619 are slightly shorter in length than guide pin 615. Electromagnets 617, 619 are provided with electric coils 621, 623, respectively, for inducing magnetic fields. As will be described in further detail below, reversible current supplied through electric coils 621, 623 provides magnetic attraction when picking a disk drive carrier from a drawer, and magnetic repulsion when placing the disk drive carrier in the drawer.

Guide pin 615 is formed from a non-ferrous material such as aluminum and may comprise a variety of shapes, but is generally conical in the version shown. In the preferred embodiment, guide pin 615 is provided with an optical service interface 631 at its distal end, and is approximately 1 inch in diameter at its base or proximal end. Optical service interface 631 comprises an LED 633 and a phototransistor 635 for coupling with complementary devices in the disk drive carriers. Other types of interfaces also may be used, depending upon the application.

Figure 21:
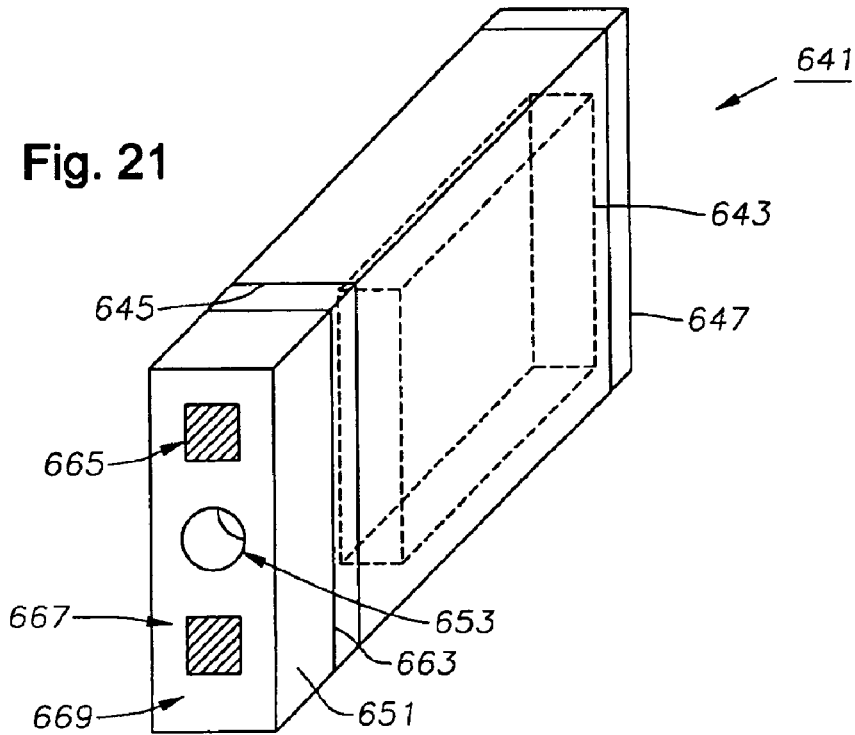
FIG. 21 is an isometric view of a disk drive carrier that is compatible with the picker of FIG. 20.
Figure 22:
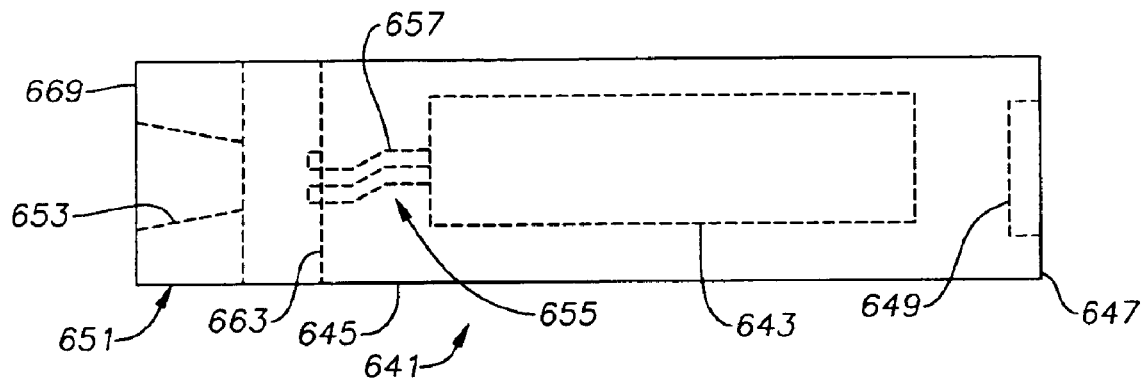
FIG. 22 is a side view of the disk drive carrier of FIG. 21.
Figure 23:
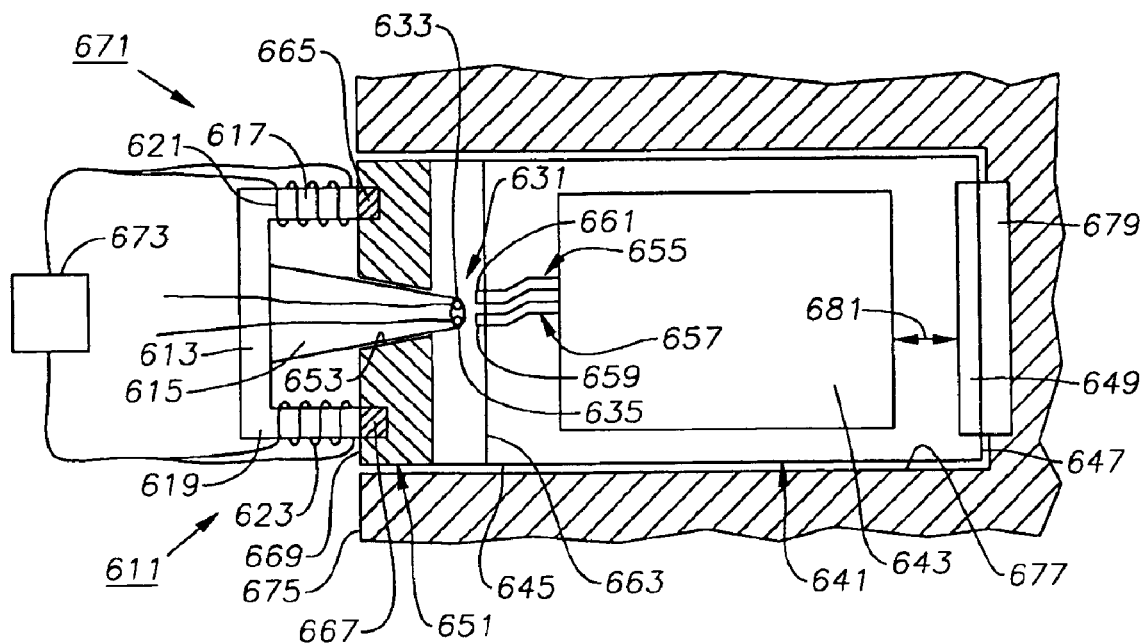
FIG. 23 is a partially sectioned side view of the picker and disk drive carrier of FIGS. 20–22 in operation in the automated disk drive library of FIG. 19.

Referring now to FIGS. 21–23, disk drive carrier 641 supports disk drive 643 in a unitary drive assembly as shown. Carrier 641 is generally rectangular in shape having a front end 645 and a rearward end 647 with a backplane connector 649. A front bezel 651 is mounted to front end 645 and has a tapered hole 653 that is complementary to guide pin 615. Hole 653 provides access to an optical service interface 655 on a small printed circuit board (not shown) located behind bezel 651. Preferably, optical service interface 655 comprises a flexible cable 657 having an LED 659 and a phototransistor 661. The printed circuit board is electrically connected with an RS232 TTL interface that is available on the disk drive 643 option block. Bezel 651 also has a pair of embedded magnets 665, 667 located adjacent to its front surface 669. Copper shielding 663 extends between disk drive 643 and bezel 651 as an EMI shield for disk drive 643.

In operation (FIG. 23), picking tool 611 and a plurality of disk drive carriers 641 (one shown) are designed to be utilized in a system, such as an automated disk drive library 671 having a computer or controller 673. Interface 631 on picking tool 611 is connected to the service processor of controller 673. Each disk drive carrier 641 is mounted in a rack 675 having a plurality of slots or drawers 677. Drawer 677 has a connector 679 for engaging backplane connector 649 on carrier 641.

Picking tool 611 is mounted to a positioning means such as a robotic arm (not shown) for selectively engaging and interfacing with disk drive 643 in carrier 641. After the positioning means properly aligns picking tool 611 with a desired carrier 641, guide pin 615 is inserted into hole 653 in bezel 651. The optical service interfaces 631, 655 optically interconnect when LED 633 and phototransistor 635 are in close proximity to phototransistor 661 and LED 659, respectively. With this interconnection, data or information is exchanged between controller 673 and disk drive 643 in the accessed carrier 641, regardless of the status of the connection between disk drive 643, connector 649 of carrier 641, and connector 679 in drawer 677. Thus, drive 643 may be analyzed or diagnosed by controller 673 via picking tool 611 even if the backplane data connection of drive 643 is faulty or failing, as long as drive 643 is powered.

To remove carrier 641 from drawer 677, controller 673 activates electromagnets 617, 619 to attract magnets 665, 667, respectively. Since tapered guide pin 615 is closely received by the tapered hole 653 in bezel 651, picker tool 611 can firmly and precisely withdraw carrier 641 and move it to another location. Guide pin 615 supports the majority of the side loads that picker tool 611 is subjected to while carriers 641 are being moved from slot to slot within library 671. In other words, electromagnets 617, 619 provide horizontal support for carrier 641, and guide pin 615 provides vertical support for carrier 641. The electromagnetic poles of picking tool 611 only have to hold in the plane of inserting and extracting a carrier 641 relative to a drawer 677 (see arrows 681 on right side of FIG. 23), which is normally a slower operation than a slot-to-slot transport of a carrier 641 within the library 671. This configuration lessens the possibility of a carrier 641 being dropped by picking tool 611. After picking tool 611 arrives at the desired location and carrier 641 is aligned with and inserted into a drawer 677, controller 673 releases carrier 641 from picking tool 611 by reversing the current through coils 621, 623, such that electromagnets 617, 619 on picking tool 611 repel magnets 665, 667. Guide pin 615 is then smoothly withdrawn from hole 653 by backing picking tool 611 away from carrier 641.

Figure 19:
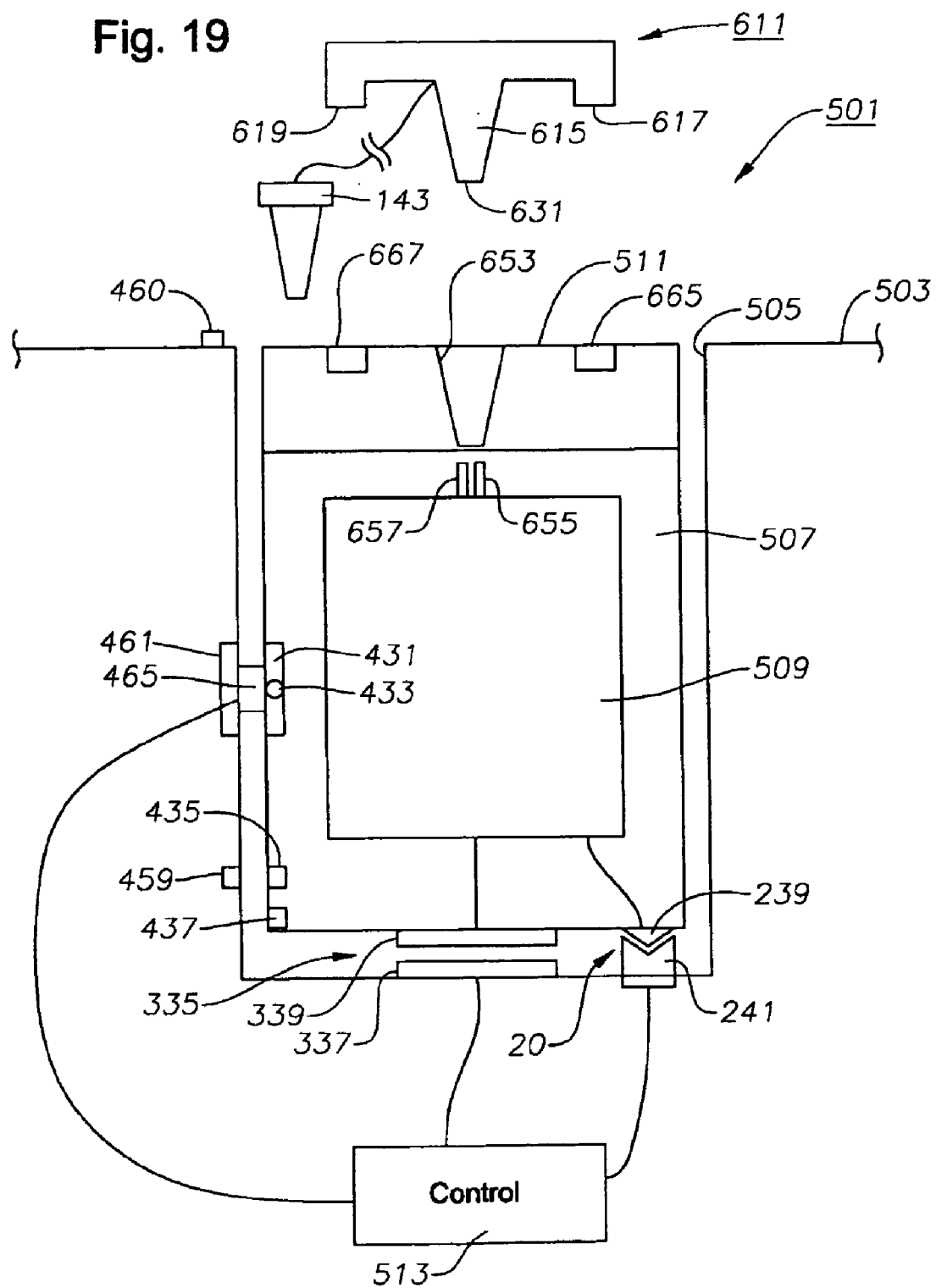
FIG. 19 is a schematic drawing of an automated disk drive library utilizing the aforementioned components and is constructed in accordance with the present invention.

Referring now to FIG. 19, an automated disk drive library 501 having each of the aforementioned components of the present invention is shown. Library 501 has a rack 503 with a plurality of drawers 505 (one shown). Each drawer 505 is interconnected with a control system such as host computer 513, via a copper fiber or optical fiber system. A disk drive assembly comprising a drive carrier 507 having one disk drive 509 mounted thereto that is removably located in drawer 505. An automated robotic picker 611 is used for engaging carrier 507 and inserting it into or removing it from drawer 505 as described above for FIGS. 20–23, via computer 513. Drive carrier 507 has a front bezel 511 with a keyed hole 653 located adjacent to an optical source and sensor pair 655 that may be coupled to an optional, manually-controlled, optical probe 143 (see FIGS. 9 and 10). Field service personnel may utilize probe 163 to communicate with a service processor.

The main data interface for disk drive 509 is provided by self-healing coupler 20 (see FIGS. 5–7). In the "in-line" mode, coupler 20 couples the target disk drive 509 to a serial link, the other target disk drives, and the copper or optical fiber initiator when no break or problem in communication and link at the target disk drive 509 exists. On the other hand, coupler 20 by-passes disk drive 509 while maintaining the serial link of the other disk drives and the copper fiber initiator when a break (such as break 5 in FIG. 1) or problem in communication and link at disk drive 509 exists. In the embodiment shown, coupler 20 utilizes optical interface 239 on drive carrier 507 and optical interface connector 241 in drawer 505 (see FIGS. 11–13). Data is primarily accessed and stored on disk drive 509 by computer 513 via operational signals sent through the optical circuit of coupler 20. With coupler 20, disk drive 507 is readily equipped to detach from one fiber optic interface connector 241 and reattach to another.

Power to disk drive 509 is supplied via magnetic coupling 335 (see FIG. 14). When disk drive 509 is inserted into drawer 505, split core transformer 337 magnetically couples with split core transformer 339 to deliver electrical power to disk drive 509. This magnetic coupling is connectorless and occurs without physical contact.

Disk drive 509 and carrier 507 may be manually inserted into and interconnected with drawer 505, and manually removed and disconnected therefrom by depressing eject button 460. Alternatively, these functions may be automated by inserting carrier 507 into drawer 505 until pin 433 contacts and engages drive mechanism 461 (see FIGS. 15–18) as described above. Computer 513 then actuates drive mechanism 461 to pull and seat carrier 507 into drawer 505. Proper registration of carrier 507 is verified by sensor 459 sensing magnets 435, 437. Disk drive 509 and carrier 507 may be automatically disconnected and removed from drawer 505 as described above.

The automated disk drive library of the present invention has many advantages, including a system and method of communicating to the copper fiber initiator and the host computer when a computer interfaced device has been removed from an overall system. The automatic enable and disable system and method provides a communications system and method to a host computer and to a copper fiber initiator when an interfaced device has been unlatched and about to be removed from a system, such as when a "hot-pluggable" disk drive has been unlatched and about to be removed from a serial RAID system.

The automated disk drive library maintains the serial link between devices when a break in communication or link at one of the devices has occurred, and provides switching of a serial device with a communication or link problem from an in-line mode in which the serial device is serially linked to other devices to a by-pass mode in which the serial device is by-passed and the other devices are re-coupled and serially linked together. The automated disk drive library also provides a self-healing coupler for a serial storage architecture wherein the self-healing coupler by-passes any disk drive or drives in which communication or link has been broken and re-couples and serially links all remaining active disk drives.

The automated disk drive library uses reliable, optically-linked sources and sensors to provide a substantially equivalent, RS232-type service interface with disk drives, particularly within a redundant array of independent disk drives. This interface allows access to the drives without unit removal or service interruption. In addition, the interface holes in the drives and/or bezels are very small and inconspicuous. Consequently, the presence of the optical pair on each drive is undetectable and inaccessible except by the specially designed probe. Moreover, the probe and the hole are keyed to prevent misalignment. This design provides a low cost, electrically nonobtrusive alternative that eliminates bent pins and poor connector interfaces.

The picker assembly allows not only for movement of the drive carriers within the library, but also allows for the system to issue diagnostic commands for automated or "call home" type analysis or problematic drives. The drives may be analyzed even if their backplane data connection is faulty or failing. These problematic drives can then be removed by the picker from the drawer slot and replaced with fully functional spare drives stored elsewhere within the library.

The automated disk drive library minimizes transmission signal strength losses along the main fiber optic cable of the backplane. The backplane connectors of one embodiment diminishes the optical signal by a maximum loss of only 3 dB per connector, and those of the other embodiment diminish the signal by a maximum loss of only 6 dB per connector. The array of independent disk drives are readily inserted or removed from any of the fiber optic connectors on the backplane with a reliable mechanical interface. In this sense, the connectors are "self-healing" when the doors of the connectors pivot back into proximity and contact with their respective bases. No user intervention is required to ensure reconnection of the main fiber optic cable. In this regard, the drive assemblies are "hot-pluggable" into the optic cable backplane and transmission need not be interrupted to insert or remove the drive assemblies.

The automated disk drive library eliminates power connectors on the backplane, thereby providing a connectionless means of powering a redundant array of independent disk drives. In addition, the split core transformer portions and the elements within the disk drive assembly are hermetically sealed. Thus, when the power transformer backplane is used in conjunction with optically-based interface connectors, a completely electric-free, wireless union can be achieved between the drive assemblies and the subsystem. In addition, the system uses a sensor to detect the presence and location of the drive carrier in the drawer. The system has the ability to automatically eject the drive carrier if for example, there is a disruption in service. The system is also equipped with a push button for manual ejection of the drive carrier. The drawer has a self-healing optical backplane for optical connectors, and power is provided through magnetic coupling. The drives themselves may be hermetically sealed for protection and portability. Finally, single or multi-slot units may be mounted in the automated disk drive library with automated pickers for storage/retrieval of individual drive carriers.

While the invention has been shown or described in only some of its forms, it should be apparent to those skilled in the art that it is not so limited, but is susceptible to various changes without departing from the scope of the invention.

What is claimed is:

1. An automated disk drive library, comprising:
   a disk drive assembly;
   a rack having a drawer for supporting the disk drive assembly;
   a picker mechanism for selectively inserting and removing the disk drive assembly relative to the drawer;

control means for controlling operations of the automated disk library;

data coupling means for providing a primary data interconnection between the disk drive assembly and the control means, wherein the data coupling means is a self-healing coupler having a first element on the disk drive assembly for interconnecting with a second element in the drawer;

power means for providing connectorless power from the control means to the disk drive assembly; and engagement means for automatically engaging and disengaging the disk drive assembly with the drawer.

2. The automated disk drive library of claim 1, further comprising auxiliary means for providing a secondary data interconnection between the disk drive assembly and the control means.

3. An automated disk drive library, comprising:

a disk drive assembly;

a rack having a drawer for supporting the disk drive assembly;

a picker mechanism for selectively inserting and removing the disk drive assembly relative to the drawer;

control means for controlling operations of the automated disk drive library;

data coupling means for providing a primary data interconnection between the disk drive assembly and the control means;

power means for providing connectorless power from the control means to the disk drive assembly; and engagement means for automatically engaging and disengaging the disk drive assembly with the drawer, further comprising auxiliary means for providing a secondary data interconnection between the disk drive assembly and the control means comprising a sensor mounted to the disk drive assembly for coupling with a probe that is external to the drawer.

4. An automated disk drive library, comprising:

a disk drive assembly;

a rack having a drawer for supporting the disk drive assembly;

a picker mechanism for selectively inserting and removing the disk drive assembly relative to the drawer;

control means for controlling operations of the automated disk drive library;

data coupling means for providing a primary data interconnection between the disk drive assembly and the control means;

power means for providing connectorless power from the control means to the disk drive assembly; and engagement means for automatically engaging and disengaging the disk drive assembly with the drawer, further comprising auxiliary means providing a secondary data interconnection between a disk drive assembly and the control means;

wherein the data coupling means and auxiliary means are each independent, optically-coupled devices.

5. An automated disk drive library, comprising:

a disk drive assembly;

a rack having a drawer for supporting the disk drive assembly;

a picker mechanism for selectively inserting and removing the disk drive assembly relative to the drawer;

control means for controlling operations of the automated disk drive library;

data coupling means for providing a primary data interconnection between the disk drive assembly and the control means;

power means for providing connectorless power from the control means to the disk drive assembly; and engagement means for automatically engaging and disengaging the disk drive assembly with the drawer;

wherein the power means utilizes a split core transformer on each or the disk drive assembly and the drawer as a magnetic coupling for transferring power to the disk drive assembly.

6. An automated disk drive library, comprising:

a disk drive assembly;

a rack having a drawer for supporting the disk drive assembly;

a picker mechanism for selectively inserting and removing the disk drive assembly relative to the drawer;

control means for controlling operations of the automated disk drive library;

data coupling means for providing a primary data interconnection between the disk drive assembly and the control means;

power means for providing connectorless power from the control means to the disk drive assembly; and engagement means for automatically engage and disengaging the disk drive assembly with the drawer;

further comprising sensor means for detecting interconnection of the disk drive assembly with the drawer.

7. The automated disk drive library of claim 6, wherein the sensor means comprises a sensor and a magnet on the disk drive assembly that are actuated in response to a position of the disk drive assembly relative to the drawer.

8. An automated disk drive library, comprising:

a disk drive assembly;

a rack having a drawer for supporting the disk drive assembly;

a picker mechanism for selectively inserting and removing the disk drive assembly relative to the drawer;

control means for controlling operations of the automated disk drive library;

data coupling means for providing a primary data interconnection between the disk drive assembly and the control means;

power means for providing connectorless power from the control means to the disk drive assembly; and engagement means for automatically engaging and disengaging the disk drive assembly with the drawer;

wherein the engagement means comprises sensors for detecting a position of the disk drive assembly relative to the drawer, and a driving mechanism for moving the disk drive assembly relative to the drawer in response thereto.

9. An automated disk drive library, comprising;

a disk drive assembly;

a rack having a drawer for supporting the disk drive assembly a picker mechanism for selectively inserting and removing the disk drive assembly relative to the drawer, wherein the picker mechanism magnetically engages and optically couples to the disk drive assembly;

control means for controlling operations of the automated disk drive library;

data coupling means for providing a primary data interconnection between the disk drive assembly and the control means;

power means for providing connectorless power from the control means to the disk drive assembly; and engagement means for automatically engaging and disengaging the disk drive assembly with the drawer.

10. An automated disk drive library, comprising:

a disk drive assembly;

a rack having a drawer for supporting the disk drive assembly;

a picker mechanism for selectively inserting and removing the disk drive assembly relative to the drawer;

control means for controlling operations of the automated disk drive library;

optical data controlling means for providing a primary data interconnection between the disk drive assembly and the control means;

magnetic power means for providing connectorless power from the control means to the disk drive assembly;

sensor means for detecting interconnection of the disk drive assembly with the drawer; and engagement means for automatically engaging and disengaging the disk drive assembly with the drawer.

11. The automated disk drive library of claim 10 wherein the data coupling means is a self-healing coupler having a first element on the disk drive assembly for interconnecting with a second element in the drawer.

12. The automated disk drive library of claim 10, further comprising auxiliary means for providing an optical secondary data interconnection between the disk drive assembly and the control means, wherein the auxiliary means comprises an optical sensor mounted to the disk drive assembly for coupling with an optical probe that is external to the drawer.

13. The automated disk drive library of claim 10 wherein the magnetic power means utilizes a split core transformer on each of the disk drive assembly and the drawer as a magnetic coupling for transferring power to the disk drive assembly.

14. The automated disk drive library of claim 10 wherein the sensor means comprises a sensor and a magnet on the disk drive assembly that are actuated in response to a position of the disk drive assembly relative to the drawer.

15. The automated disk drive library of claim 10 wherein the engagement means comprises sensors for detecting a position of the disk drive assembly relative to the drawer, and a driving mechanism for moving the disk drive assembly relative to the drawer in response thereto.

16. The automated disk drive library of claim 10 wherein the picker mechanism magnetically engages and optically couples to the disk drive assembly.

17. An automated disk drive library, comprising:

a plurality of disk drive assemblies, each having a disk drive mounted to a drive carrier;

a rack having a plurality of drawers, wherein each of the drawers supports one of the disk drive assemblies;

a picker mechanism for selectively inserting and removing the disk drive assemblies relative to the drawers;

control means for controlling operations of the automated disk drive library;

an optical self-healing coupler associated with each of the disk drive assemblies and drawers, each of the self-healing couplers having a first element on the disk drive assemblies for interconnecting with a second element in the drawers, wherein the self-healing couplers provide primary data interconnection between the disk drive assemblies and the control means;

an optical data sensor mounted to each of the disk drive assemblies opposite the self-healing couplers, wherein the data sensors provide secondary data interconnections between the disk drive assemblies and the control means;

a split core transformer on each of the disk drive assemblies and drawers, wherein the split core transformers magnetically couple to transfer power to the disk drive assemblies;

an interconnection sensor and an interconnection magnet on the disk drive assemblies that are actuated in response to a position of the disk drive assemblies relative to the drawers for detecting interconnection of the disk drive assemblies with the drawers;

an engagement sensor and an engagement magnet on the drawers and disk drive assemblies for detecting a position of each of the disk drive assemblies relative to the drawers; and a driving mechanism in each of the drawers for automatically engaging and disengaging the disk drive assemblies with the drawers in response to detection of the position of the disk drive assemblies relative to the drawers.

18. The automated disk drive library of claim 17 wherein the self-healing coupler is located on a backplane at a rear of the drawer adjacent to a rear of the disk drive assembly, and the data sensor is located on a front of the disk drive assembly.

19. The automated disk drive library of claim 17 wherein, when a break in communication and link at one of the disk drive assemblies occurs, a respective one of the self-healing couplers by-passes said one of the disk drive assemblies while maintaining communications with the other disk drive assemblies.

20. The automated disk drive library of claim 17 wherein the driving mechanism comprises a gear-driven cam in each of the drawers for engaging a pin on respective ones of the disk drive assemblies.

21. The automated disk drive library of claim 17 wherein the picker mechanism magnetically engages and optically couples to the disk drive assembly, and wherein the picker mechanism has a guide pin for engaging the a hole in the carrier, and an optical service interface for interfacing with the optical data sensor.

* * * * *